US007229845B1

(12) United States Patent
Luu et al.

(10) Patent No.: US 7,229,845 B1
(45) Date of Patent: Jun. 12, 2007

(54) AUTOMATED SOURCING OF SUBSTRATE MICROFABRICATION DEFECTS USING DEFECTS SIGNATURES

(75) Inventors: Victor V. Luu, Morgan Hill, CA (US); John Poreda, Moraga, CA (US)

(73) Assignee: Si Glaz, Santa Clara, CA (US)

( * ) Notice: Subject to any disclaimer, the term of this patent is extended or adjusted under 35 U.S.C. 154(b) by 355 days.

(21) Appl. No.: 10/765,505

(22) Filed: Jan. 26, 2004

(51) Int. Cl.
*H01L 21/66* (2006.01)

(52) U.S. Cl. ................................ 438/16; 257/E21.525

(58) Field of Classification Search .................... 438/5, 438/7, 10–11, 14, 16–18, 22–24, 29, 31, 34–36, 438/128–130, 149, 484, 538
See application file for complete search history.

(56) References Cited

U.S. PATENT DOCUMENTS

| | | | | |
|---|---|---|---|---|
| 5,831,865 | A * | 11/1998 | Berezin et al. | 716/7 |
| 5,913,105 | A * | 6/1999 | McIntyre et al. | 438/16 |
| 5,982,920 | A | 11/1999 | Tobin, Jr. et al. | |
| 6,393,602 | B1 * | 5/2002 | Atchison et al. | 716/4 |
| 6,407,808 | B2 | 6/2002 | Yoda et al. | |
| 6,466,895 | B1 | 10/2002 | Harvey et al. | |
| 6,535,776 | B1 | 3/2003 | Tobin, Jr. et al. | |
| 6,542,830 | B1 * | 4/2003 | Mizuno et al. | 702/35 |
| 2002/0052053 | A1 * | 5/2002 | Ono et al. | 438/12 |

OTHER PUBLICATIONS

Tobin, et al., Feature Analysis and Classification of Manufacturing Signatures Based on Semiconductor Wafermaps 12 pages.
Tobin, et al., Automatic Classification of Spatial Signatures on Semiconductor Wafermaps 11 pages.
Karnowski, et al., Fuzzy Logic Connectivity in Semiconductor Defect Clustering 10 pages.
Gleason, et al., An Integrated Spatial Signature Analysis and Automatic Defect Classification System 8 pages.
Gleason, et al., Rapid Yield Learning through Optical Defect and Electrical Test Analysis 11 pages.
Tobin, et al., An Image Paradigm for Semiconductor Defect Data Reduction 12 pages.
Tobin, et al., Automated Analysis for Rapid Defect Sourcing and Yeild Learning 15 pages.
Tobin, et al., Using Historical Wafermap Data for Automated Yeild Analysis 16 pages.
Tobin, et al., Adaptation of The Fuzzy K-Nearest Neighbor Classifier for Manufacturing Automation 9 pages.
Tobin, et al., Image Retrieval in the Industrial Environment 9 pages.

* cited by examiner

*Primary Examiner*—Michael Lebentritt
*Assistant Examiner*—Andre' Stevenson
(74) *Attorney, Agent, or Firm*—Fernandez & Associates, LLP

(57) ABSTRACT

Automated defect sourcing system identifies root-causes of yield excursion due to contamination, process faults, equipment failure and/or handling in timely manner and provides accurate timely feedback to address and contain the sources of yield excursion. A signature bank stores known wafer surface manufacturing defects as defect signatures. The signature of a manufacturing defect pattern is associated with a type of equipment or process, and used to source the manufacturing defects and to provide process control for changing and/or stopping yield excursion during fabrication. A defect signature recognition engine matches wafer defects against the signature bank during wafer fabrication. Once the defect signature is detected during fabrication, handling and/or disposing the root-cause of the corresponding defect is facilitated using messages according to an event handling database. Optionally, a real-time process control for wafer fabrication is provided.

20 Claims, 45 Drawing Sheets

Relative Neighbor Nearest Distance Histogram (k=1)
0
5
10
15
20
25
30
0
100
200
300
400
500
600
700
800
900
1000
1100
1200
1300
1400
1500
1600
1700
1800
1900
2000
2100
2200
2300
2400
2500
2600
2700
2800
2900
3000
3100
3200
3300
3400
3500
3600
3700
3800
3900
4000
4100
4200
4300
4400
4500
4600
4700
4800
4900
5000
5100
5200
5300
5400
5500
5600
5700
5800
5900
6000

Relative Neighbor Nearest Distance Histogram (k=1)
0
2
4
6
8
10
12
14

Radial Distribution Histogram

Annular Distribution Histogram
1400
1200
1000
800
600
400
200
0
1 2 3 4 5 6 7 8 9 10 11 12 13 14 15 16 17 18 19 20 21 22 23 24 25 26 27 28 29 30 31 32 33 34 35 36 37 38 39 40

Horizontal Distribution Histogram

Vertical Distribution Histogram

Relative Neighbor Nearest Distance Histogram (k=1)
0
5
10
15
20
25
0 500 1000 1500 2000 2500 3000 3500 4000 4500 5000 5500 6000 6500 7000 7500 8000 8500 9000 9500 10000 10500 11000 11500 12000 12500 13000

Neighbor Nearest Distance Histogram (k=1)
100
90
80
70
60
50
40
30
20
10
0
k-Distance - 28
Value: 13

007
Analyze Distributed Defects

008
Analyze Repeating Defects

010
Intelligent Process Control

012
Generate Scratch Signature Bank

Automated Defect Sourcing GUI Components

AUTOMATED SOURCING OF SUBSTRATE MICROFABRICATION DEFECTS USING DEFECTS SIGNATURES

BACKGROUND

1. Field

Invention relates to detection of semiconductor fabrication defects, and in particular to a method and system for predictive, automatic and self-learning semiconductor fabrication defect signature recognition and defect sourcing.

2. Related Art

Conventional semiconductor fabrication systems incorporate statistical process control and impose control limits on the acceptable number of defects on a wafer, detect quantity of defects on a given wafer, and raise a flag if the quantity falls out of bounds. Defective wafers are inspected by human experts in the hope of pinpointing the fabrication process steps responsible for the defect. Drawbacks of this approach include: (a) defect signature recognition is primitive, and flags are raised too late and after yields have already dropped; (b) identification of the defect source is done by humans and represents a tedious and time consuming effort; and (c) successful defect sourcing depends on expert know-how that is difficult to capture.

Accordingly, there is need for (a) predictive, (b) automatic and (c) self-learning semiconductor fabrication defect signature recognition and sourcing for addressing the above problems.

SUMMARY

Automated defect sourcing system identifies root-causes of yield excursion due to contamination, process faults, equipment failure and/or handling in timely manner and provides accurate timely feedback to address and contain the sources of yield excursion. A signature bank stores known wafer surface manufacturing defects as defect signatures. The signature of a manufacturing defect pattern is associated with a type of equipment or process, and used to source the manufacturing defects and to provide process control for changing and/or stopping yield excursion during fabrication. A defect signature recognition engine matches wafer defects against the signature bank during wafer fabrication. Once the defect signature is detected during fabrication, handling and/or disposing the root-cause of the corresponding defect is facilitated using messages according to an event handling database. Optionally, a real-time process control for wafer fabrication is provided.

BRIEF DESCRIPTIONS OF DRAWINGS

FIG. 1 is a block diagram illustrating processing and inspection steps in a semiconductor fabrication line, according to an embodiment of the present invention.

FIG. 1*a* is a diagram illustrating inputs and outputs of the automated defect sourcing system, according to an embodiment of the present invention.

FIG. 2 is a data flow diagram illustrating a method for automated defect sourcing, according to an embodiment of the present invention.

FIG. 2*a* shows an example defect signature, wherein a point represents a defect and wherein the corresponding Results file would indicate defect coordinates, according to an embodiment of the present invention.

FIG. 3 is a data flow diagram illustrating a method for detecting the presence of non-random defect signatures in inspection equipment files, thereby identifying the files that are candidates for further defect signature analysis, according to an embodiment of the present invention.

FIG. 3*a* shows an example histogram of the defect k-NN distances of the Results file corresponding to the non-random defect signature of FIG. 2*a*, the histogram showing a grouping of concentrated defects with k-NN distance below 100 μm and a grouping of distributed defects with the mean around 1200 μm, according to an embodiment of the present invention.

FIG. 3*b* shows a reverse-J distribution of defect k-NN distances, according to an embodiment of the present invention.

FIG. 3*c* shows a bimodal distribution of defect k-NN distances, according to an embodiment of the present invention.

FIG. 3*d* shows a histogram of defect locations in a radial distribution pattern, according to an embodiment of the present invention.

FIG. 3*e* shows a skewed distribution of defect k-NN distances, according to an embodiment of the present invention.

FIG. 3*f* shows a wafer defect map of a Results file in which the defects are distributed in an annular pattern, according to an embodiment of the present invention.

FIG. 3*g* shows a histogram of the number of defects as a function of the ring containing the defects, corresponding to FIG. 3*f*, according to an embodiment of the present invention.

FIG. 3*h* shows a wafer defect map of a Results file in which the defects are distributed in a zonal pattern, according to an embodiment of the present invention.

FIG. 3*i* shows a histogram of the number of defects as a function of horizontal position on the wafer, corresponding to FIG. 3*h*, according to an embodiment of the present invention.

FIG. 3*j* shows the histogram of the number of defects as a function of vertical position on the wafer, corresponding to FIG. 3*h*, according to an embodiment of the present invention.

Figure 5:
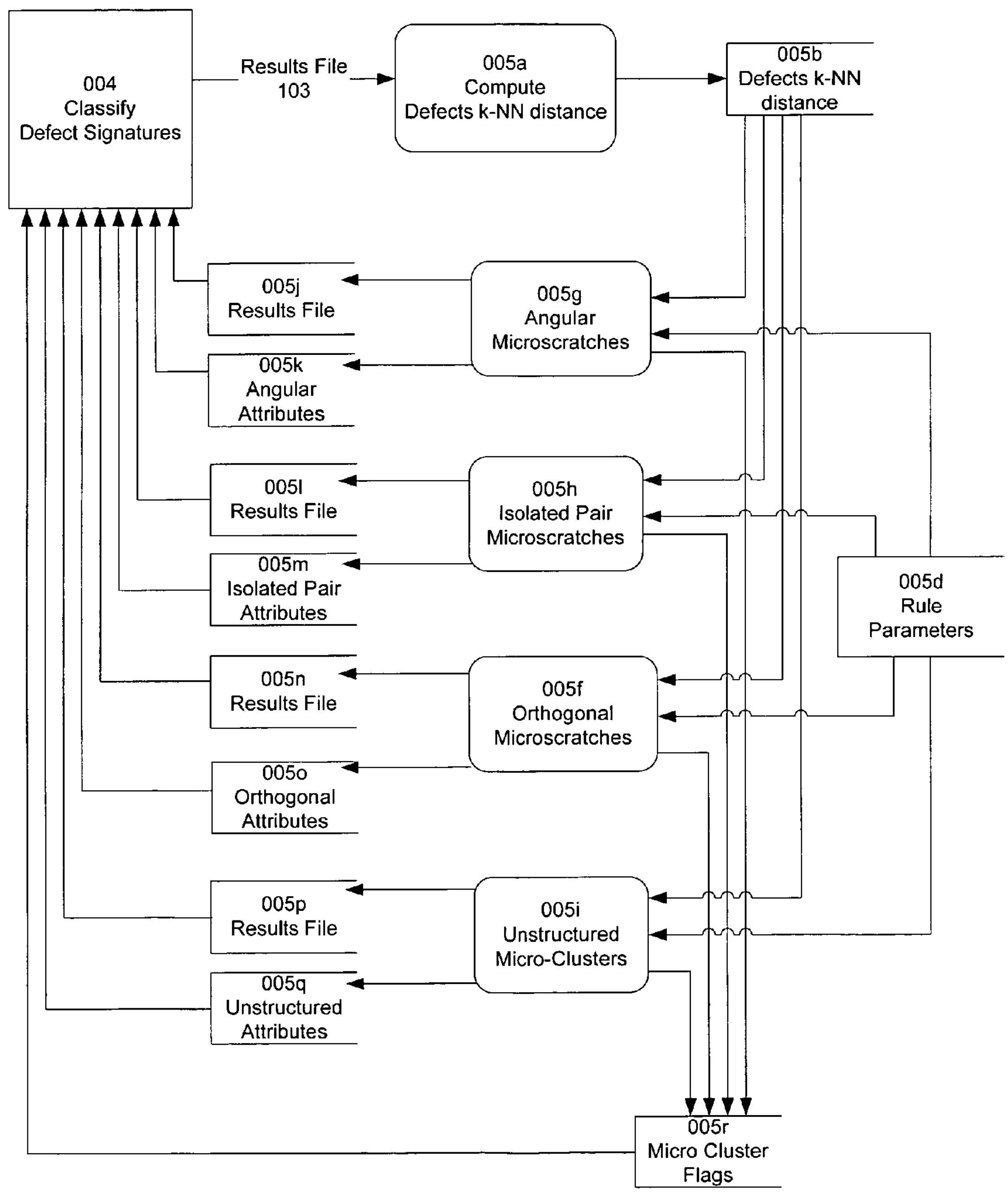
FIG. 5 is a data flow diagram illustrating a method for analyzing a Results file for micro-cluster defects, according to an embodiment of the present invention.
Figure 5A:
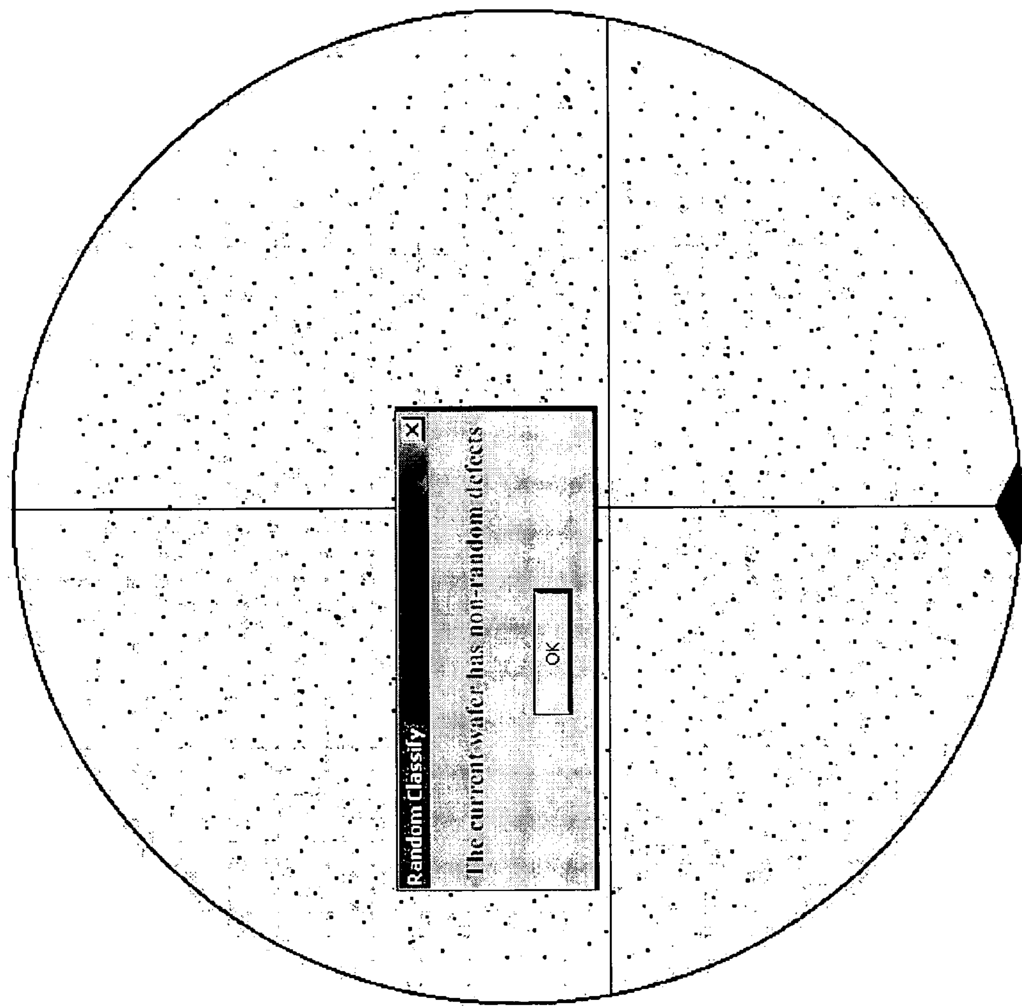

FIG. 5*a* shows a wafer defect pattern identified as having non-random defects, according to an embodiment of the present invention.

Figure 5B:
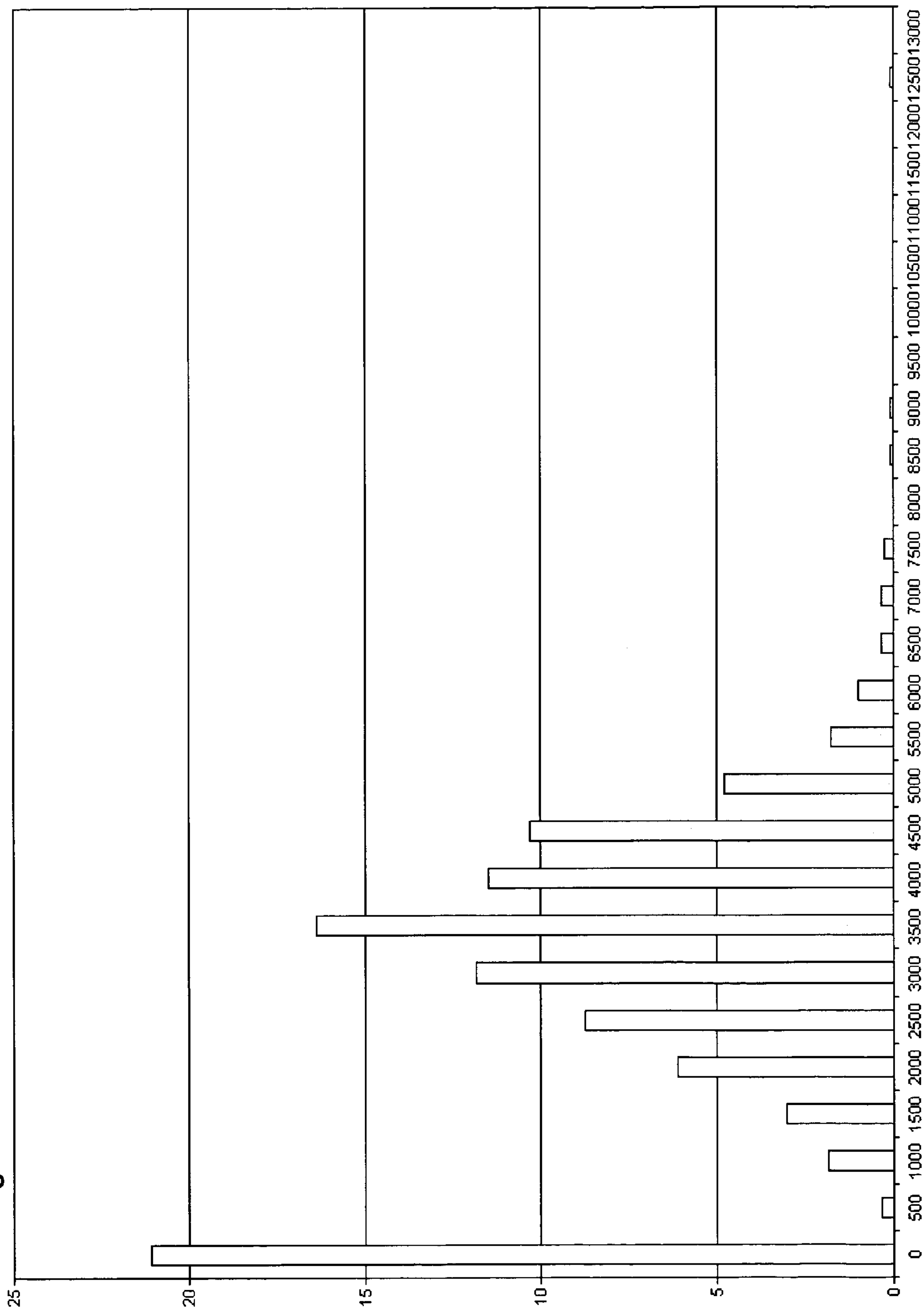

FIG. 5*b* shows a histogram of the defect k-NN distances for a Results file corresponding to FIG. 5*a* with a bi-modal distribution, according to an embodiment of the present invention.

Figure 5C:
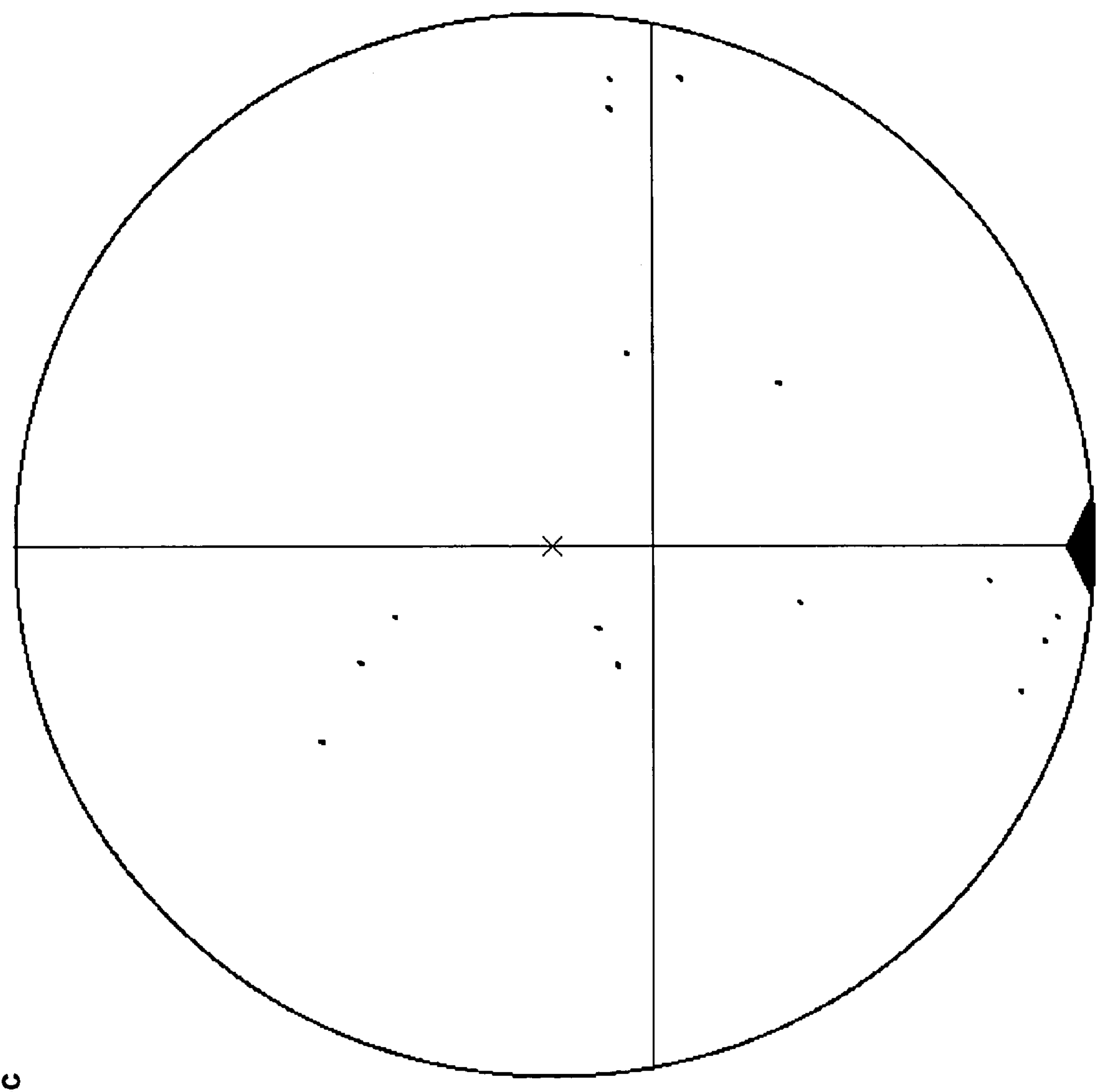

FIG. 5*c* shows a wafer defect signature resulting from filtering out the grouping of distributed defects from the Results file, and revealing that the grouping of concentrated defects was the result of micro-cluster defects, according to an embodiment of the present invention.

Figure 5D:
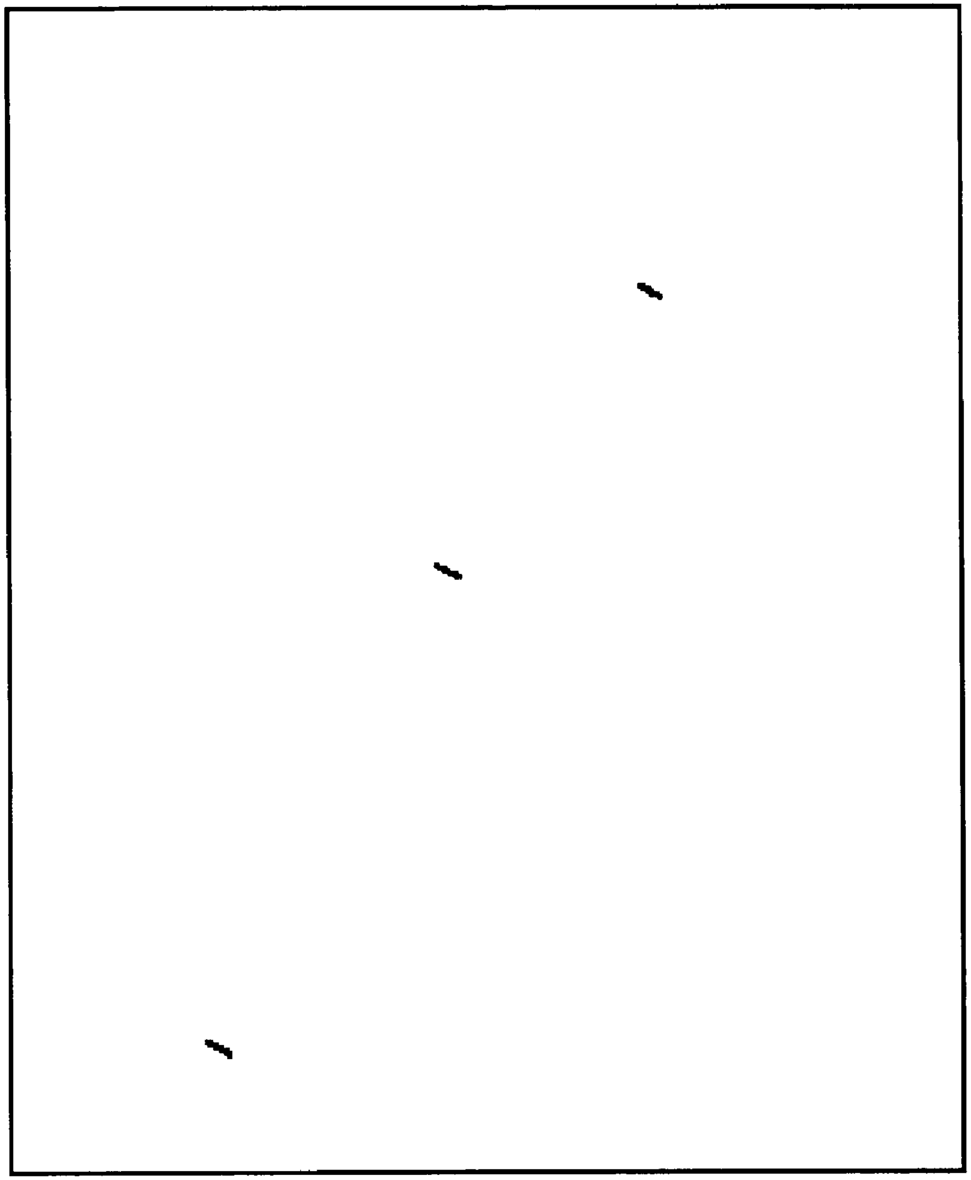

FIG. 5*d* shows an enlargement of FIG. 5*c*, indicating that the micro-cluster defects identified in the results file may be further classified as angular micro-scratches, according to an embodiment of the present invention.

Figure 6:
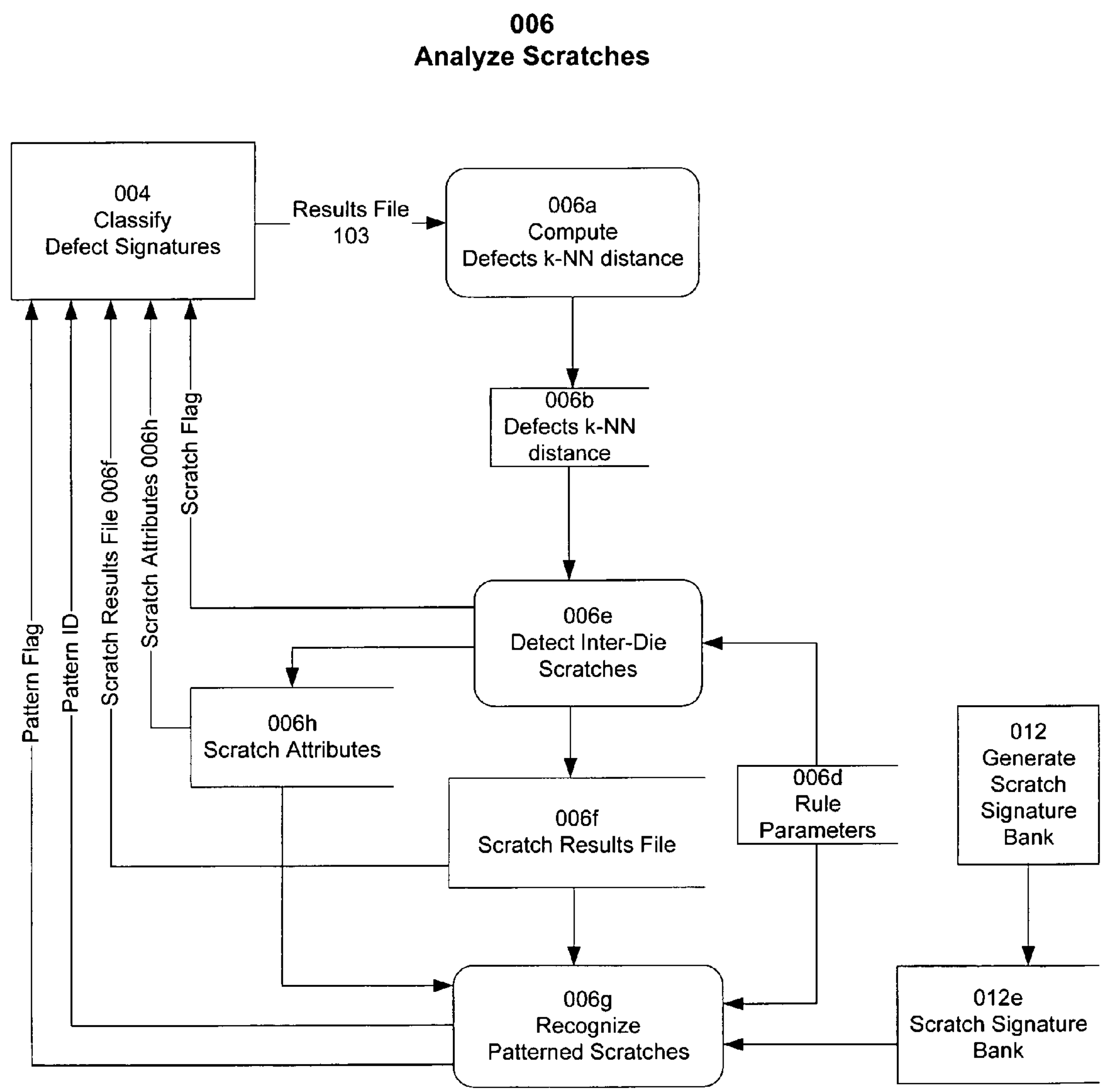

FIG. 6 is a data flow diagram illustrating a method for analyzing scratches, according to an embodiment of the present invention.

Figure 6A:
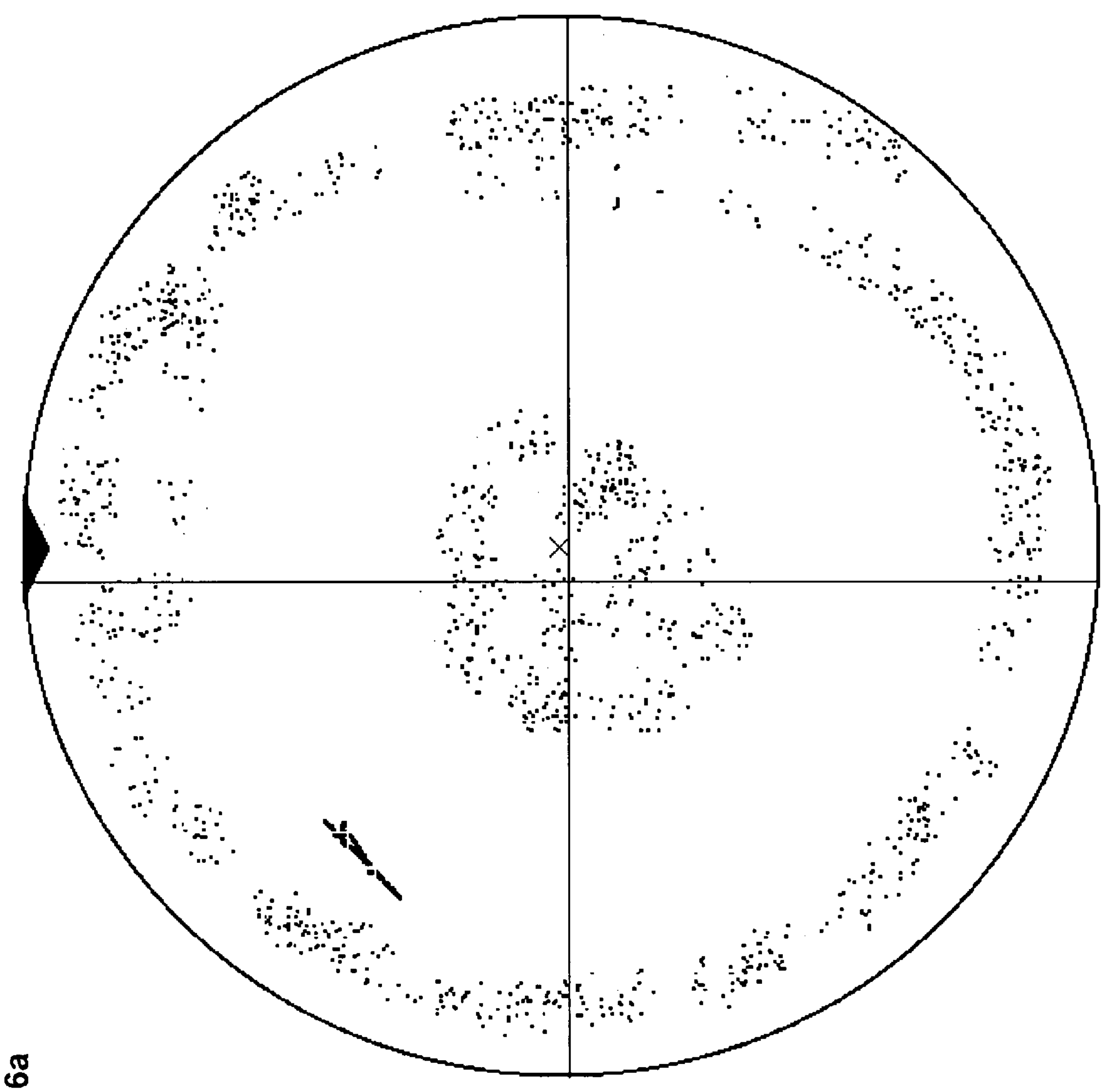

FIG. 6*a* illustrates a wafer defect pattern exhibiting a defect signature distributed in an annular pattern, and also exhibiting a scratch, according to an embodiment of the present invention.

Figure 6B:
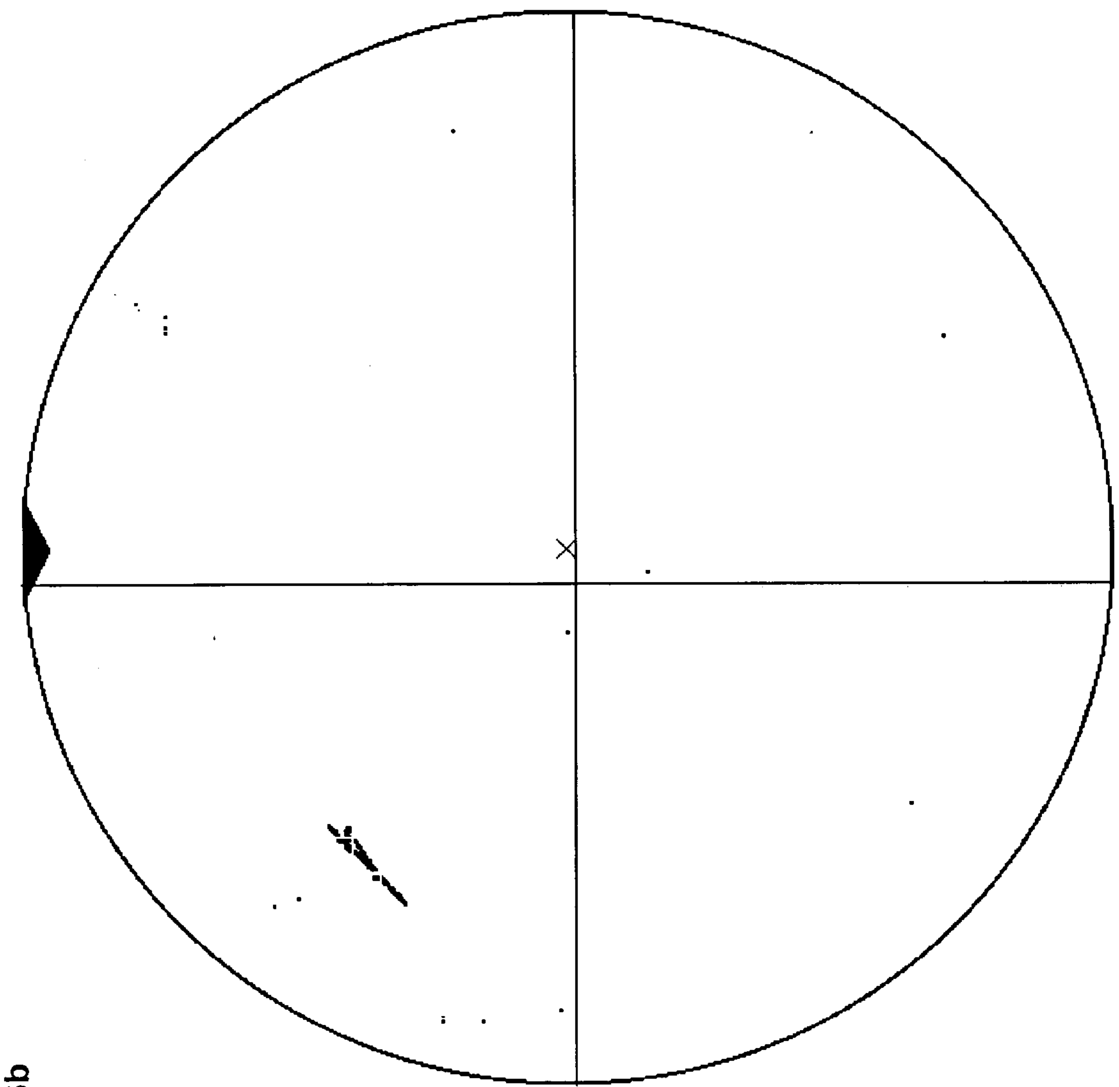

FIG. 6*b* shows the scratch cluster of FIG. 6*a*, identified by isolating the grouping of concentrated defects in the defect k-NN distribution, according to an embodiment of the present invention.

Figure 6C:
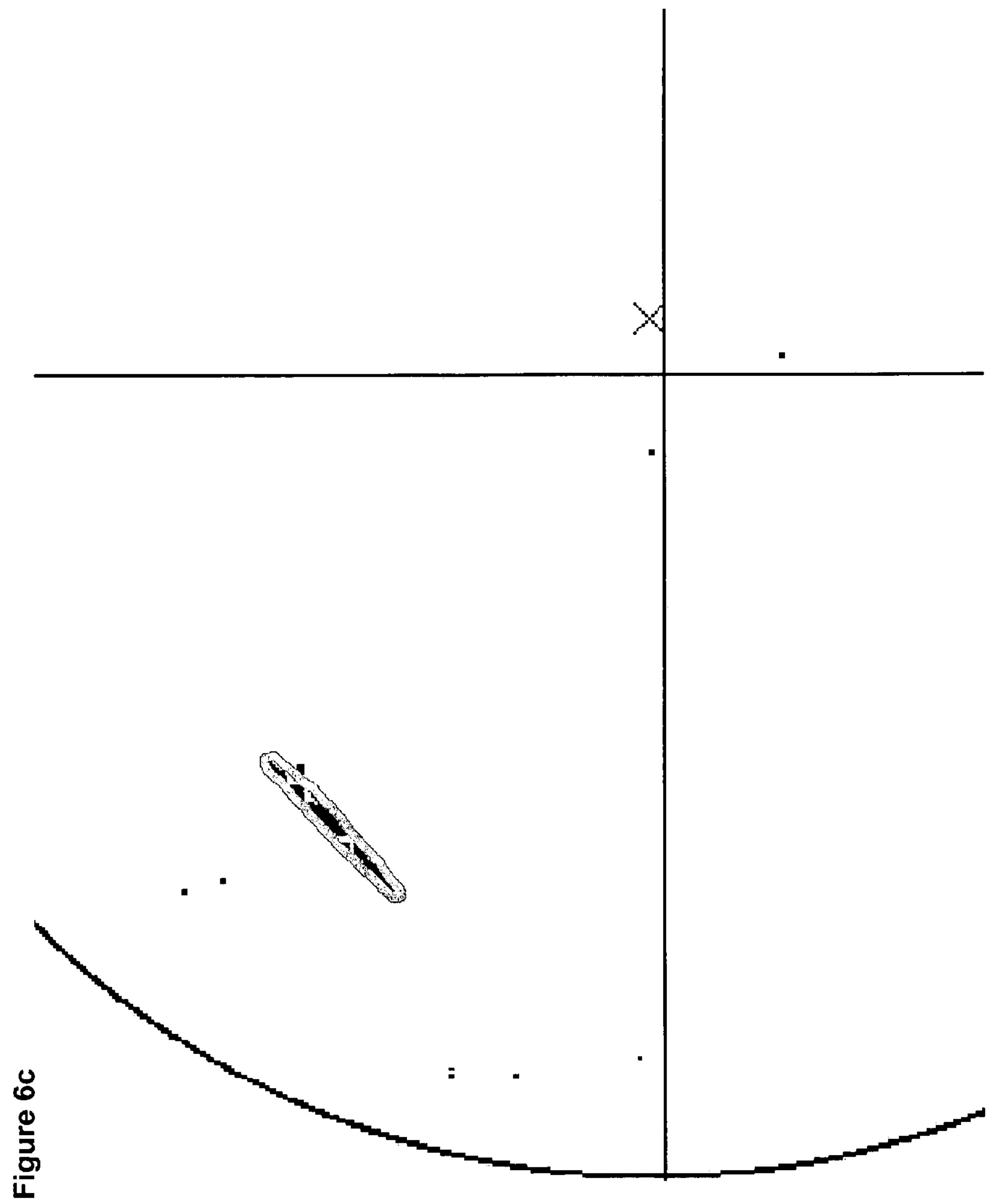

FIG. 6*c* shows the scratch of FIG. 6*a* enlarged with an envelope drawn around the scratch cluster, according to an embodiment of the present invention.

Figure 6D:
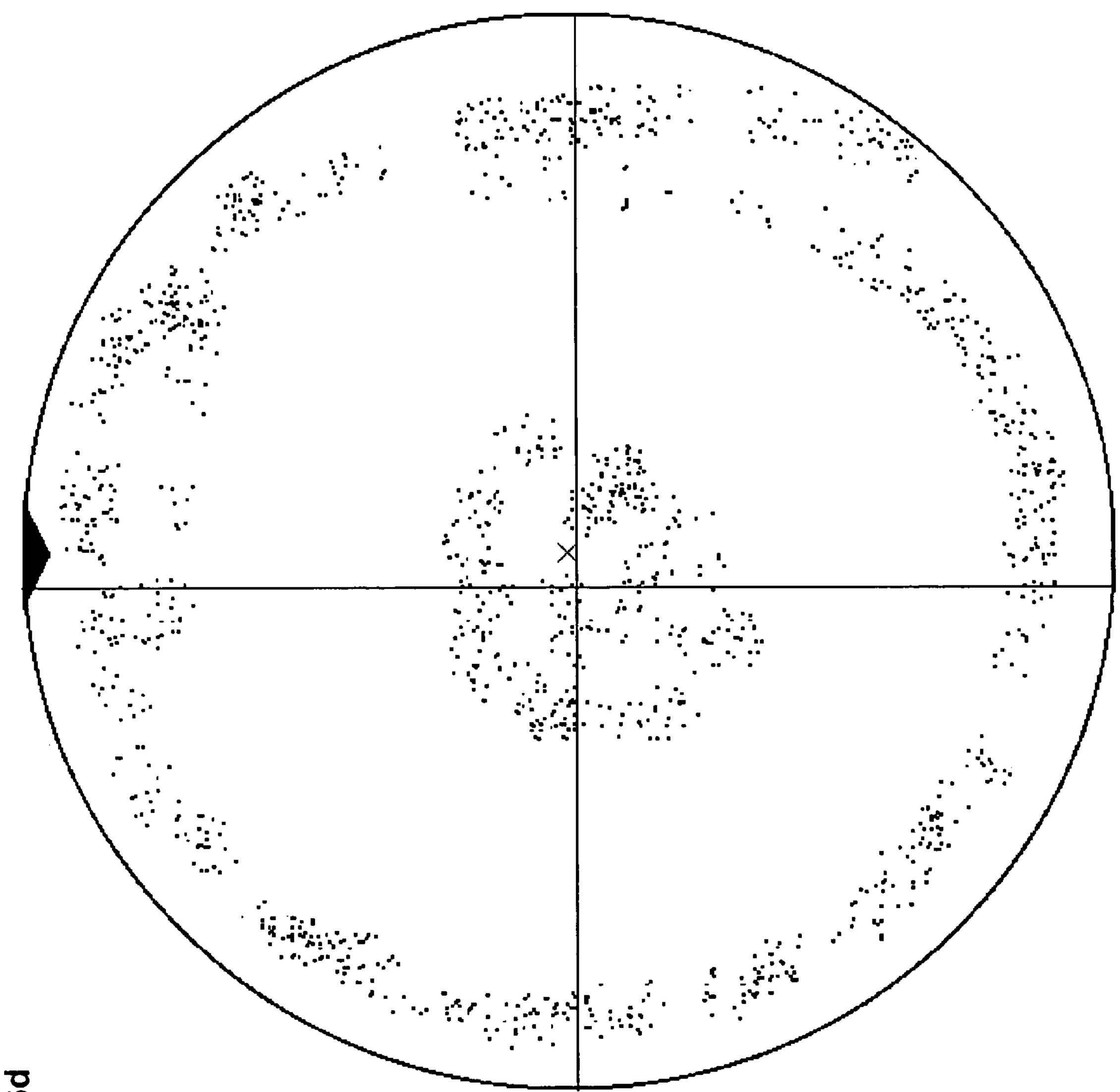

FIG. 6*d* shows the result of filtering out the identified scratch from the results file of FIG. 6*a*, wherein the remaining defects are distributed in an annular pattern, according to an embodiment of the present invention.

Figure 6E:
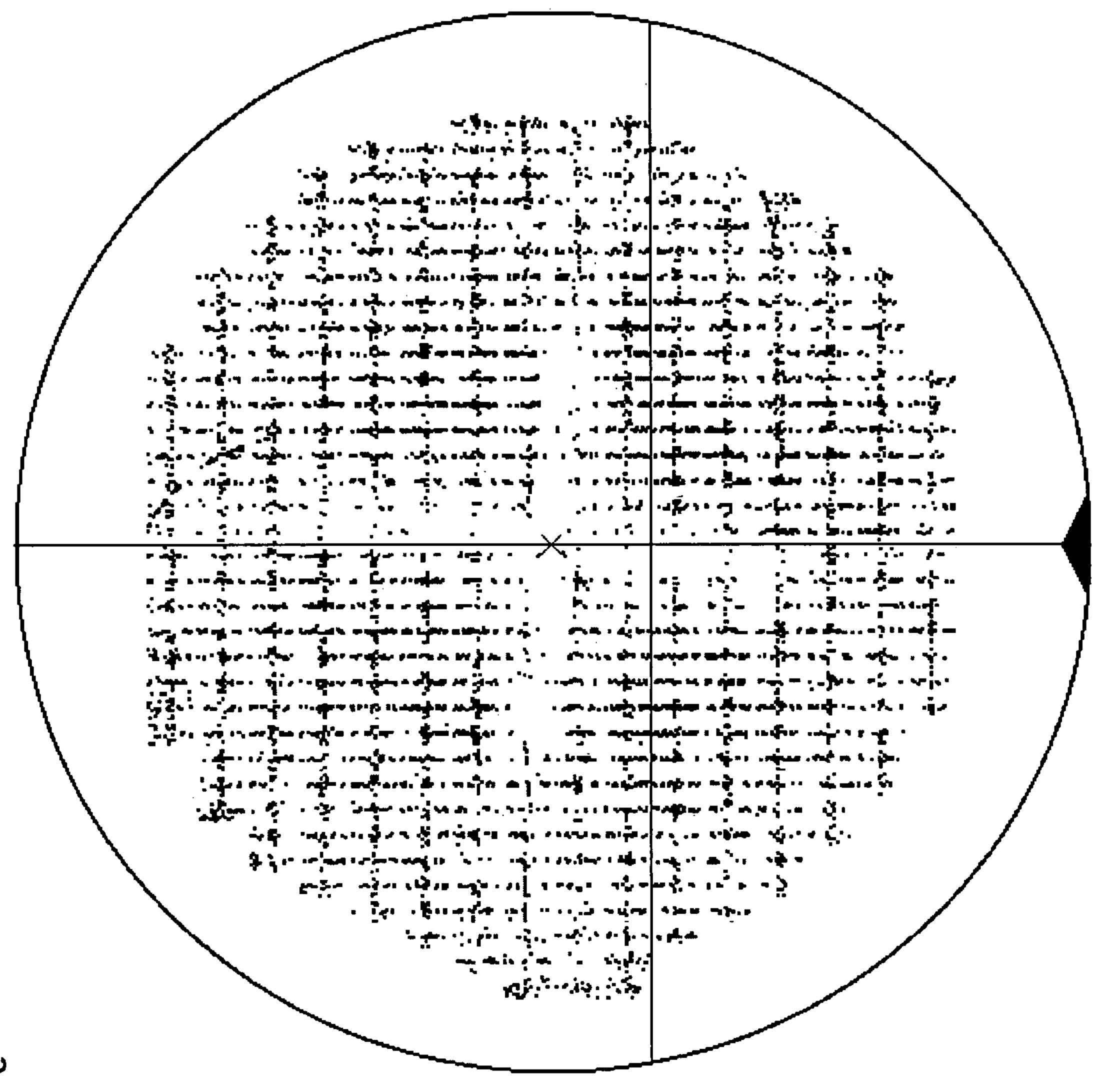

FIG. 6*e* illustrates a wafer defect pattern, according to an embodiment of the present invention.

Figure 6F:
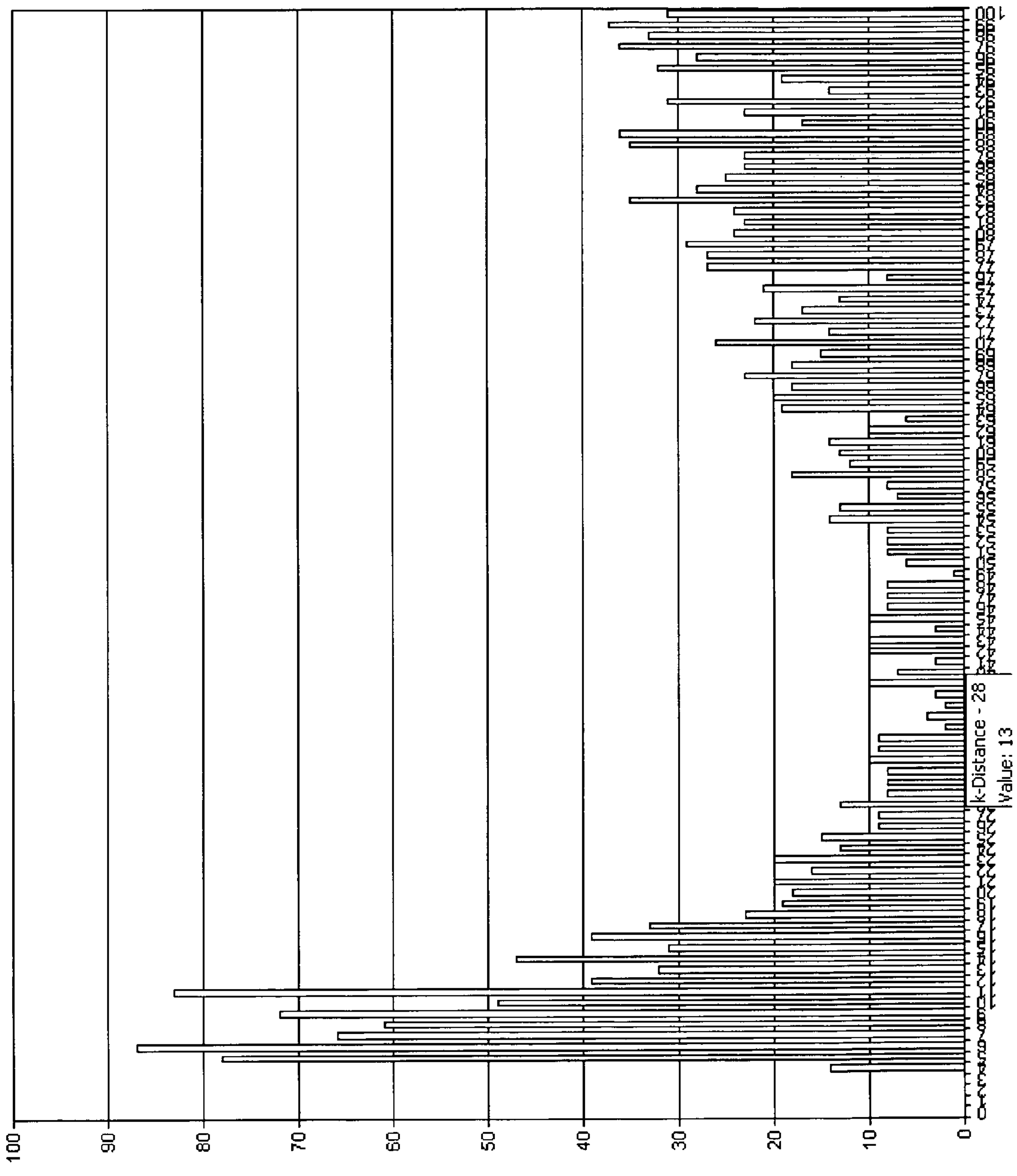

FIG. 6*f* shows a bi-modal defect k-NN distance distribution (for k=1) corresponding to FIG. 6*e*, indicating a grouping of concentrated defects with k-NN distance from 0 μm to 30 μm, according to an embodiment of the present invention.

Figure 6G:
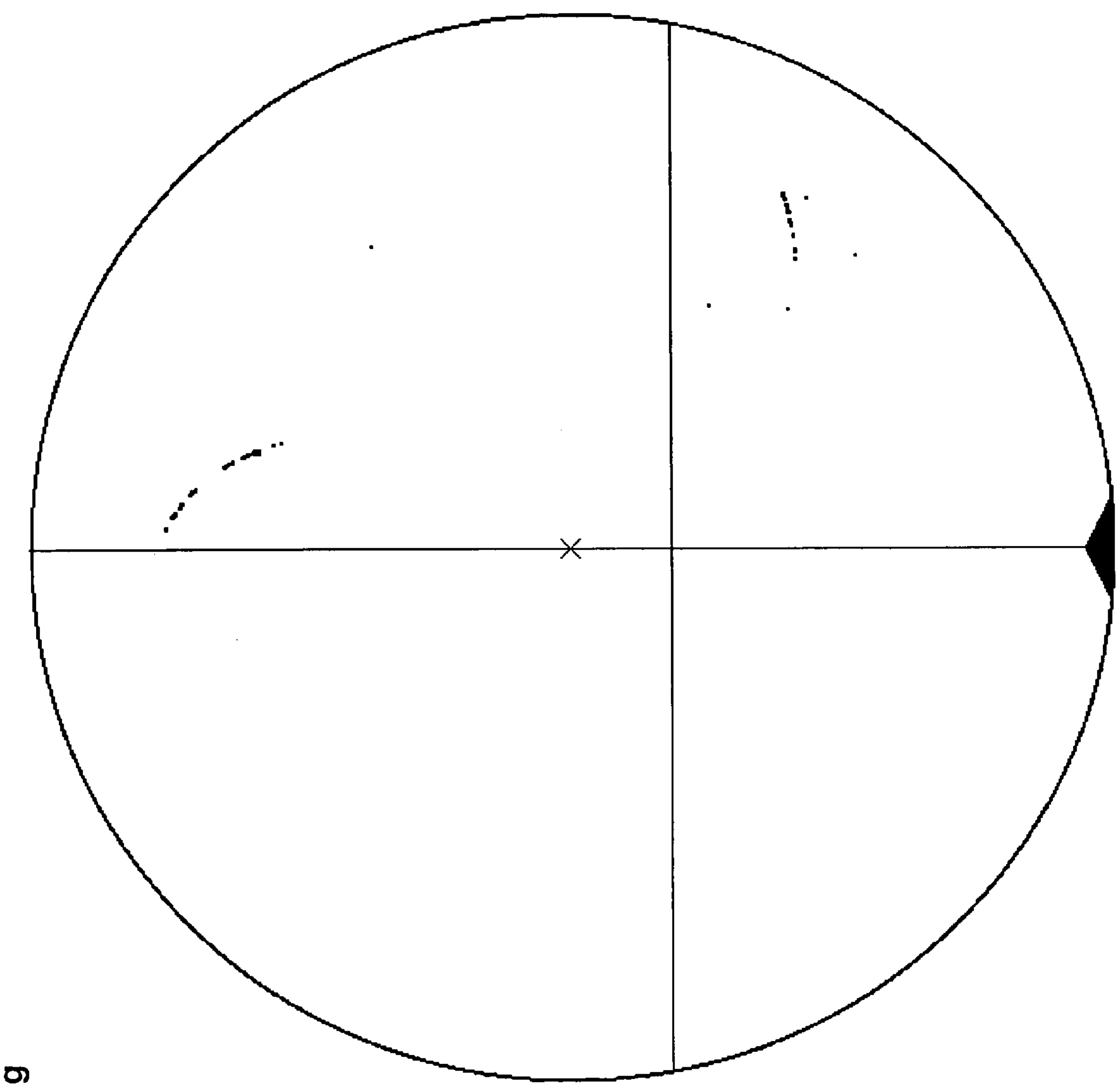

FIG. 6*g* shows two scratches, isolated and identified by filtering out all defects with a defect k-NN distance greater than 30 μm, according to an embodiment of the present invention.

Figure 6H:
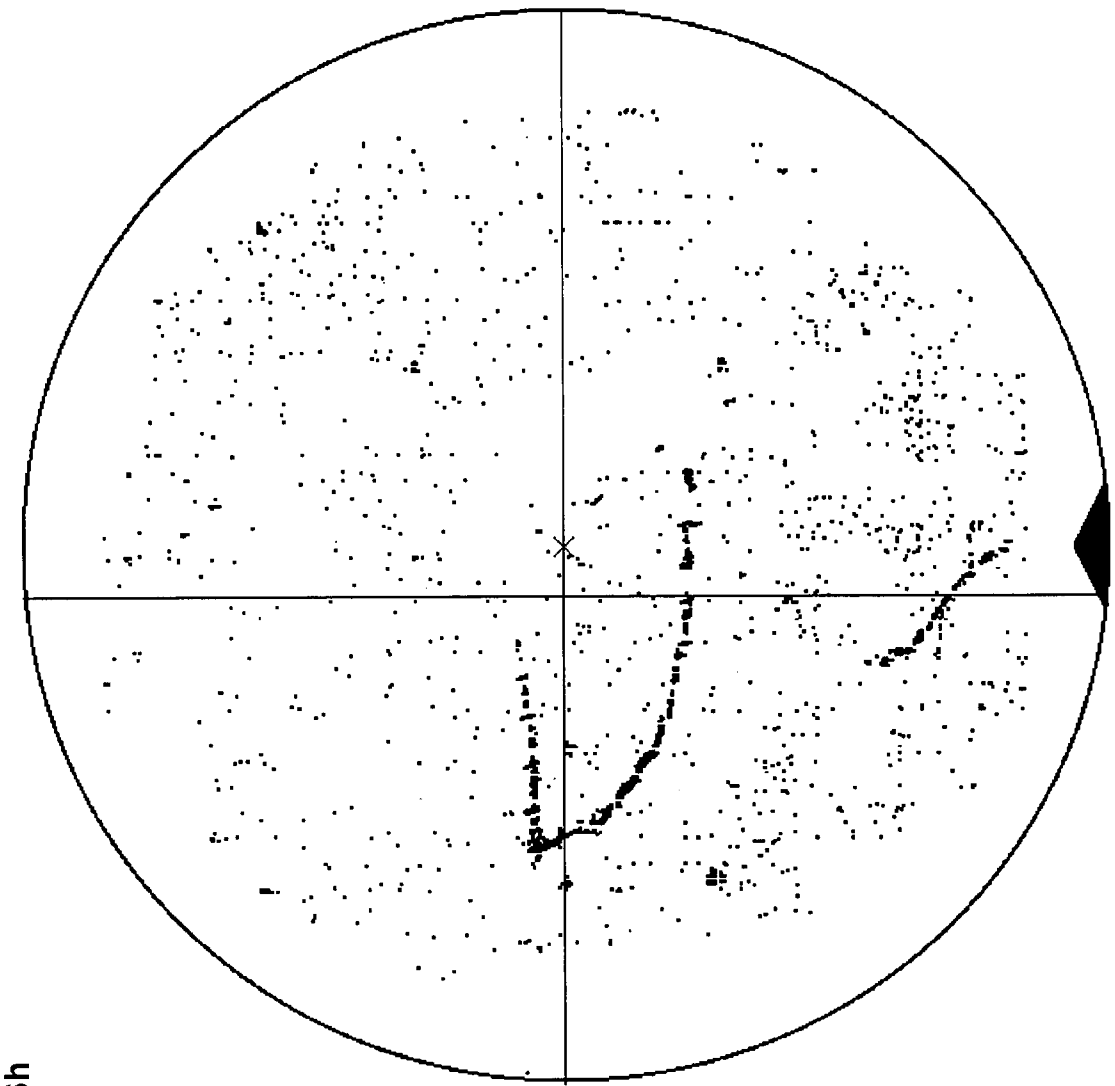

FIG. 6*h* shows a wafer with scratches, according to an embodiment of the present invention.

Figure 6I:
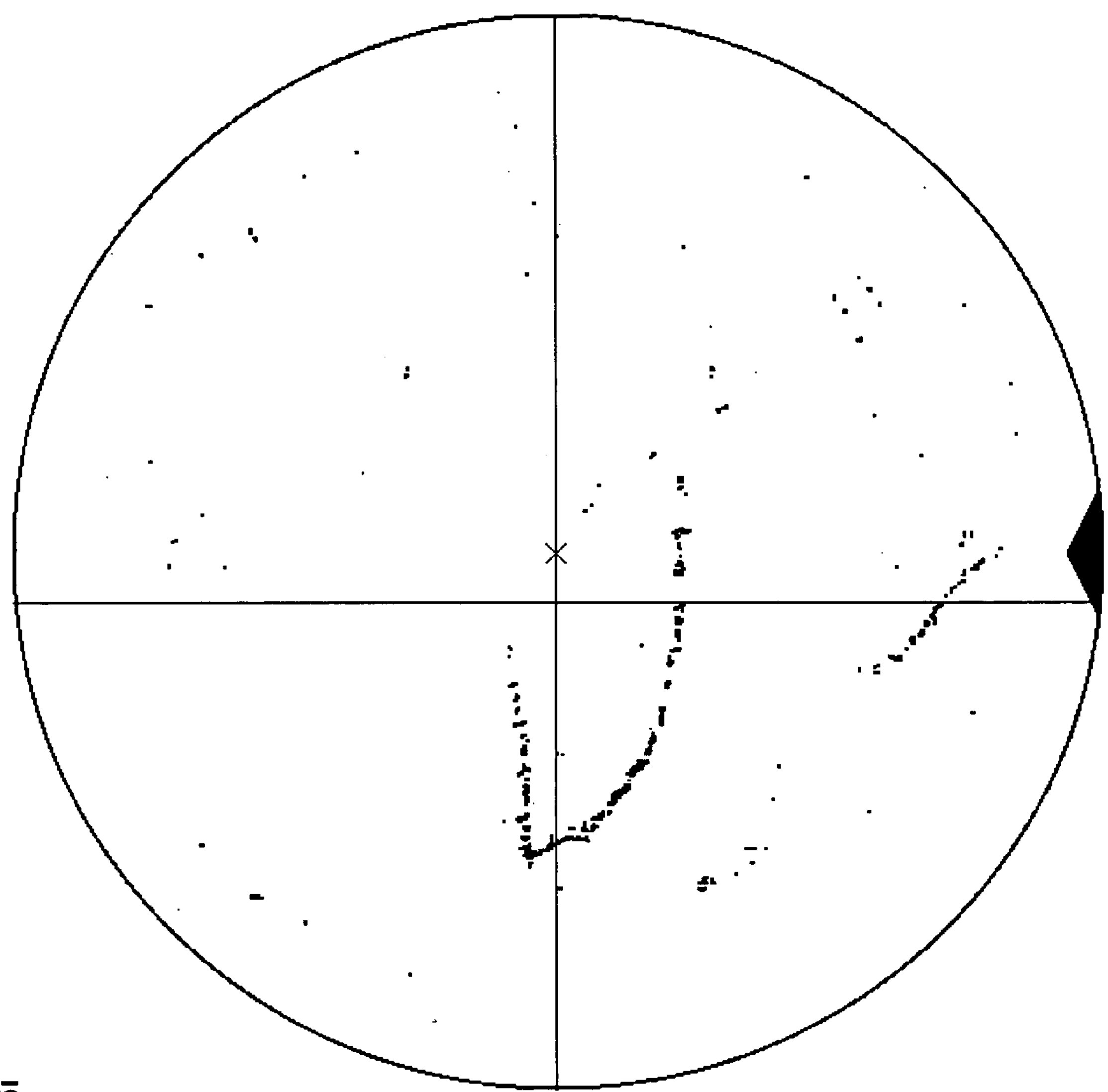

FIG. 6*i* shows the scratches of FIG. 6*h* isolated, according to an embodiment of the present invention.

Figure 7:
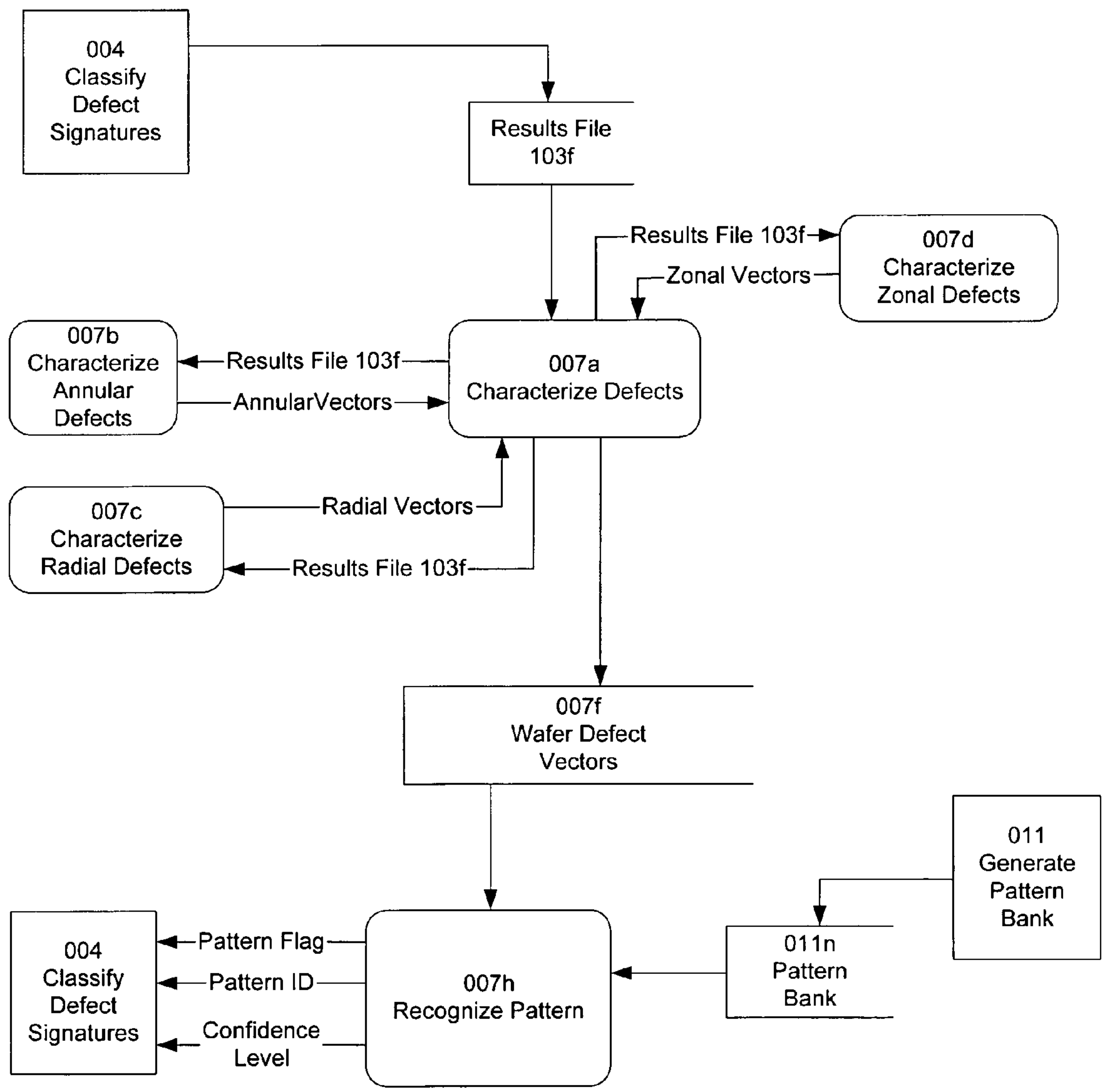

FIG. 7 is a data flow diagram illustrating a method for analyzing distributed defects, according to an embodiment of the present invention.

Figure 7A:
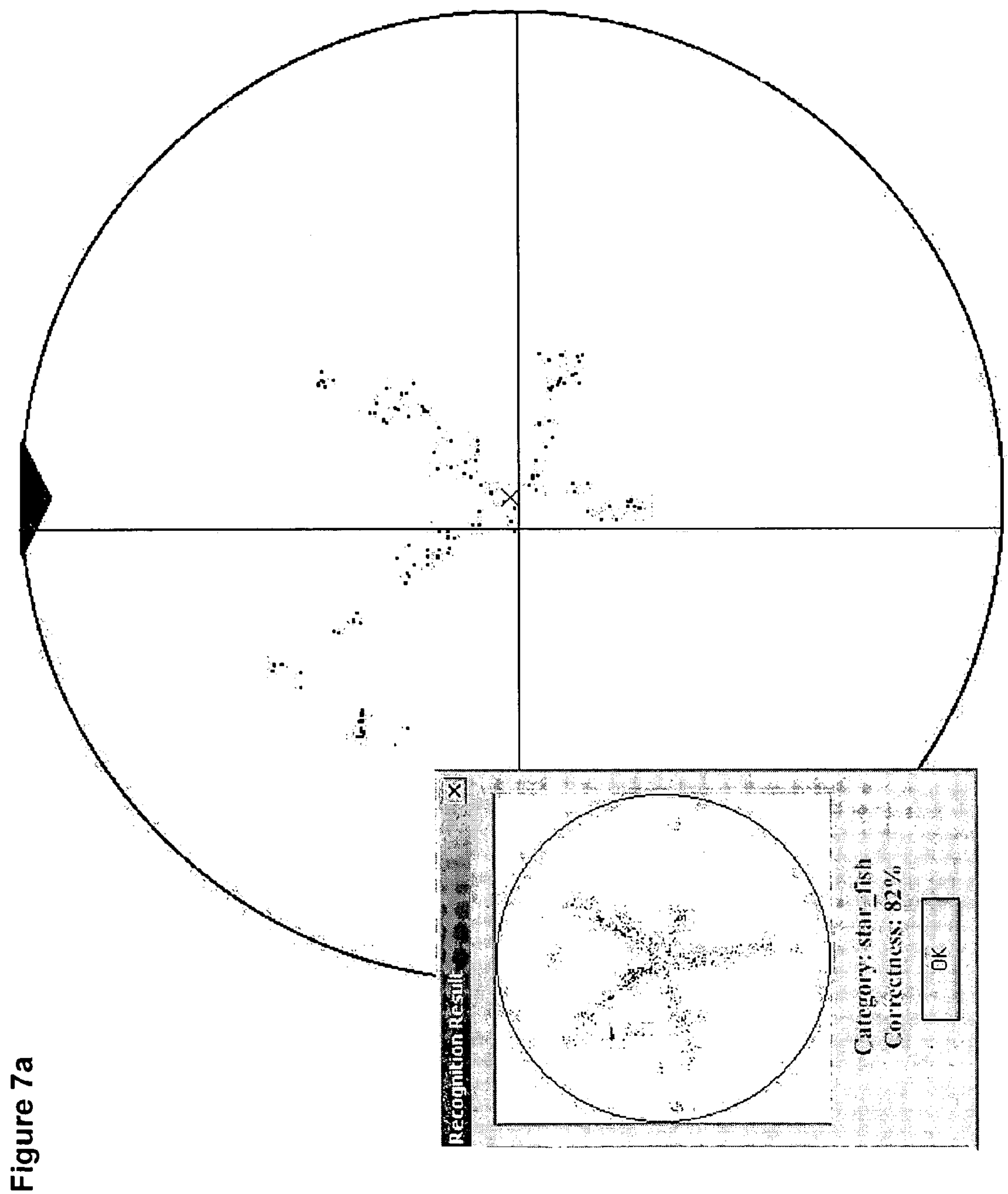

FIG. 7*a* shows a "starfish" pattern matched against a faint defect signature, according to an embodiment of the present invention.

Figure 8:
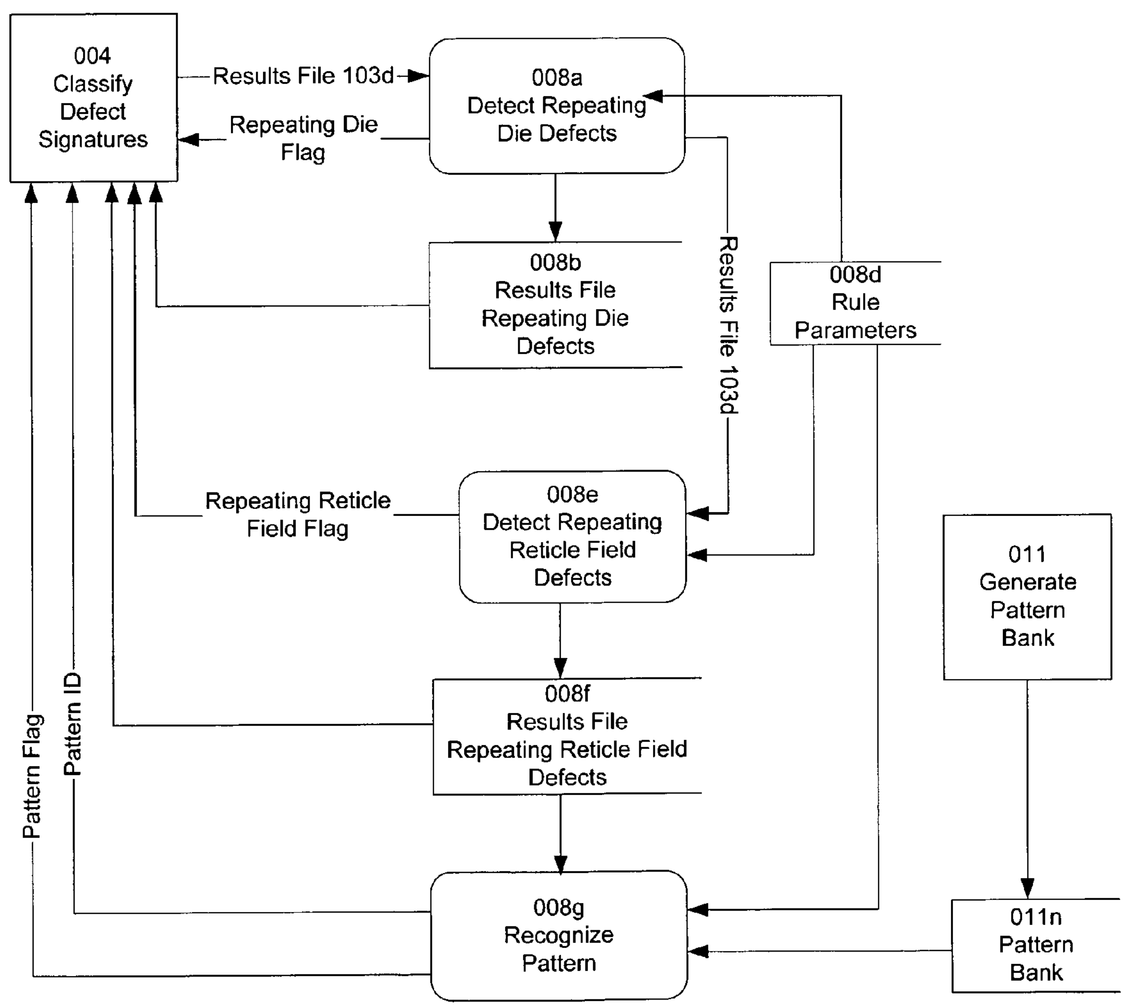

FIG. 8 is a data flow diagram illustrating a method for analyzing repeating defects, according to an embodiment of the present invention.

Figure 2:
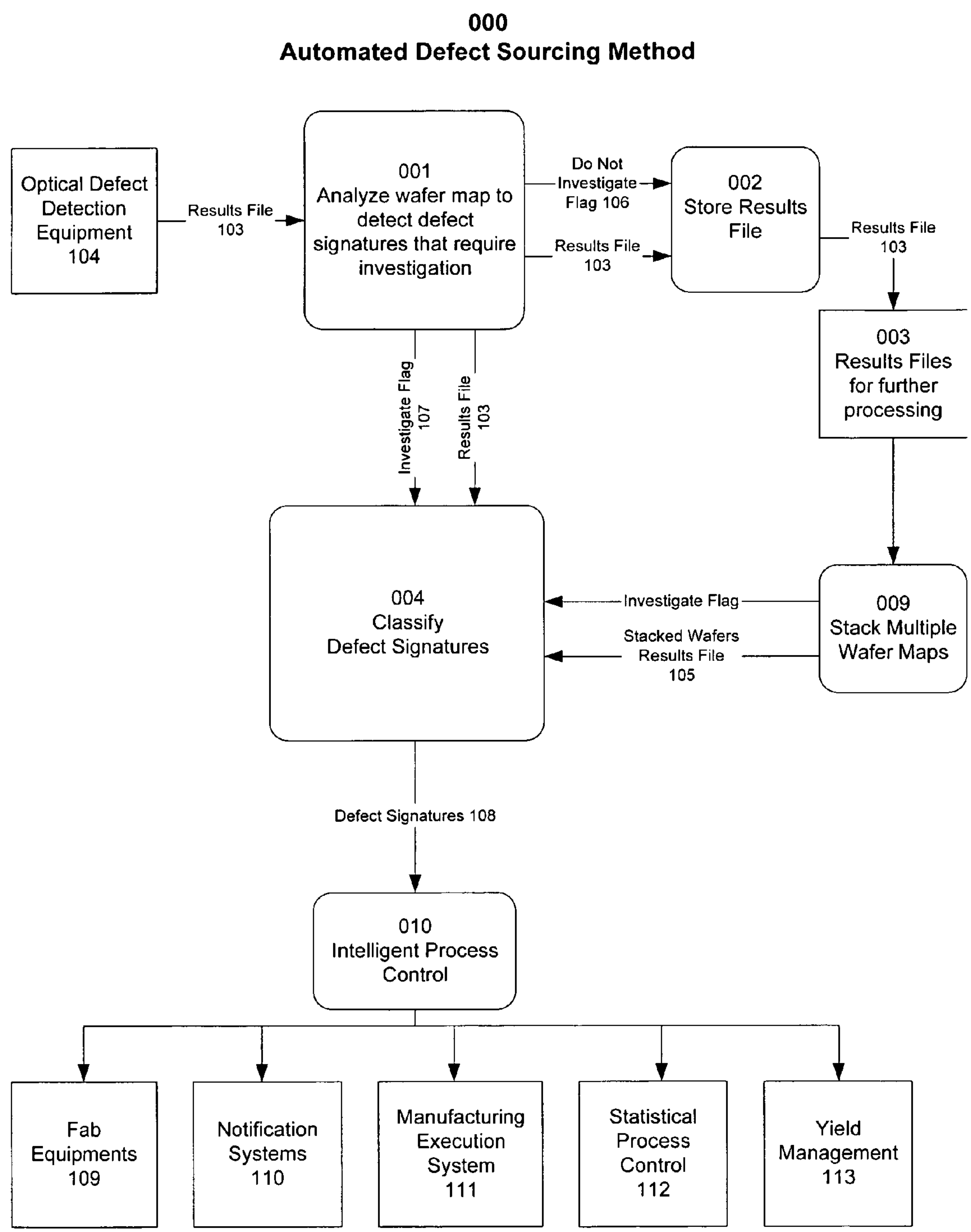
Figure 2A:
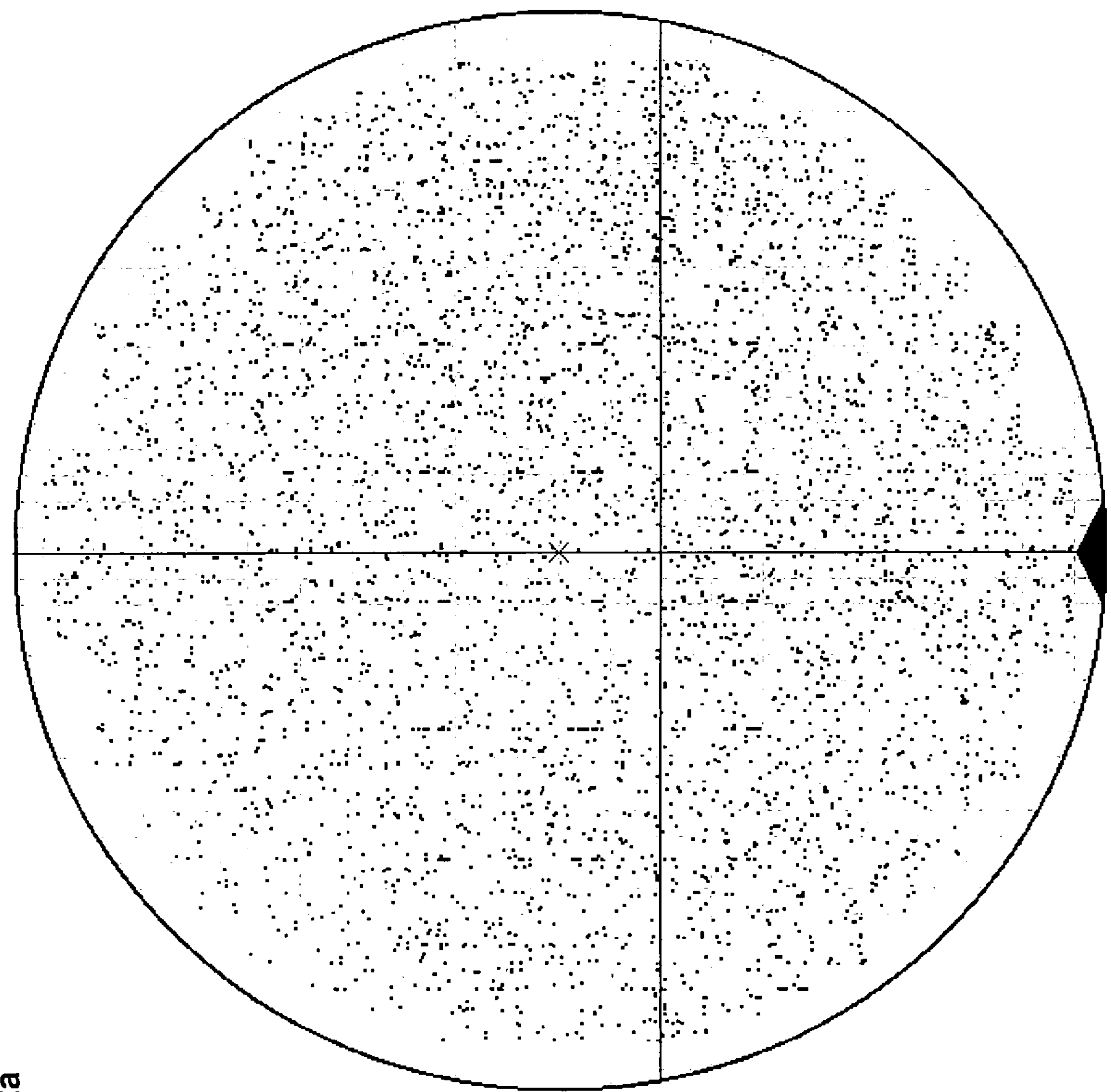
Figure 8A:
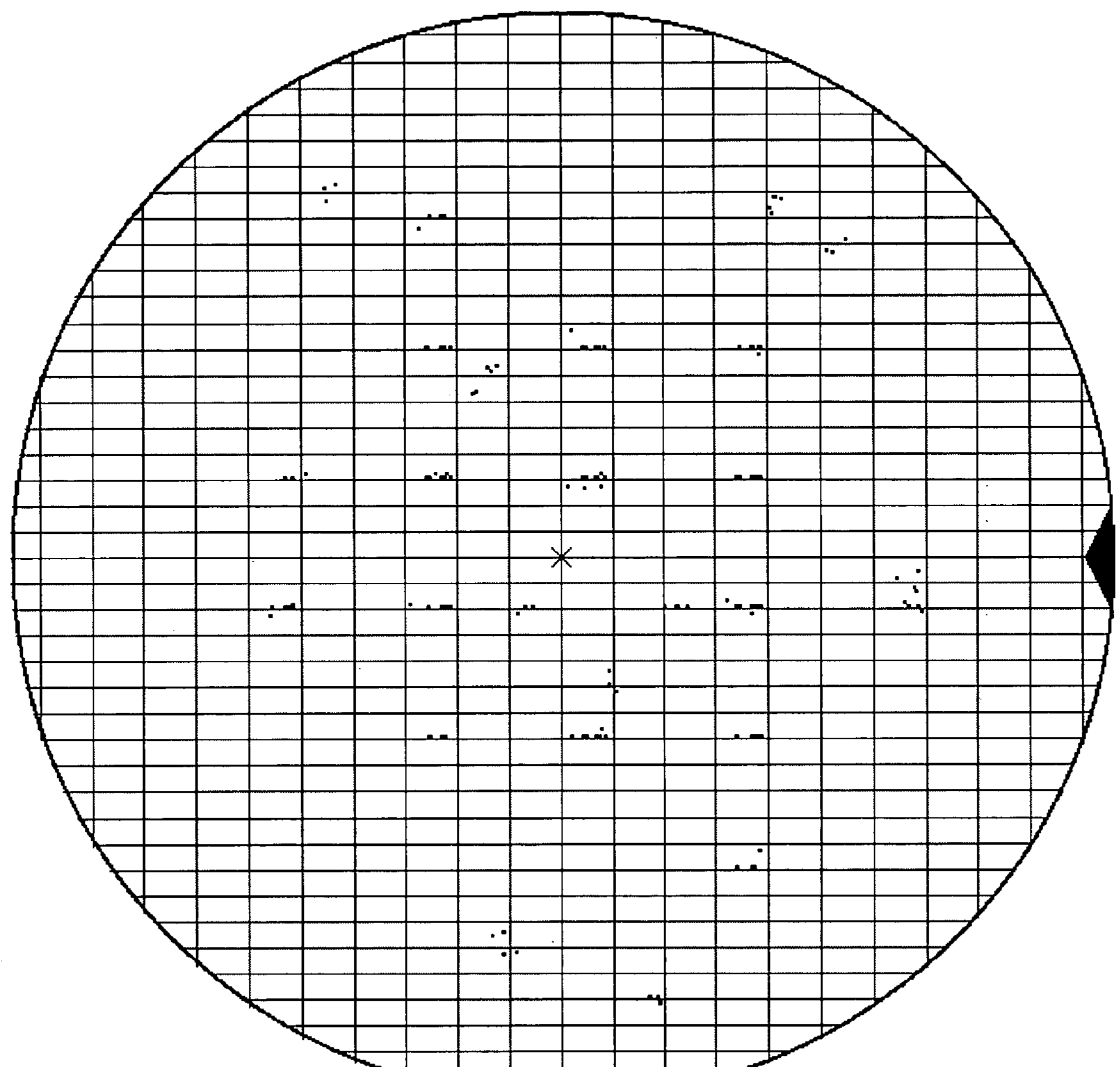

FIG. 8*a* shows a repeating wafer pattern, wherein the corresponding results file is obtained by locating the defects with the same coordinate within the die from the results file of FIG. 2*a*, according to an embodiment of the present invention.

Figure 8B:
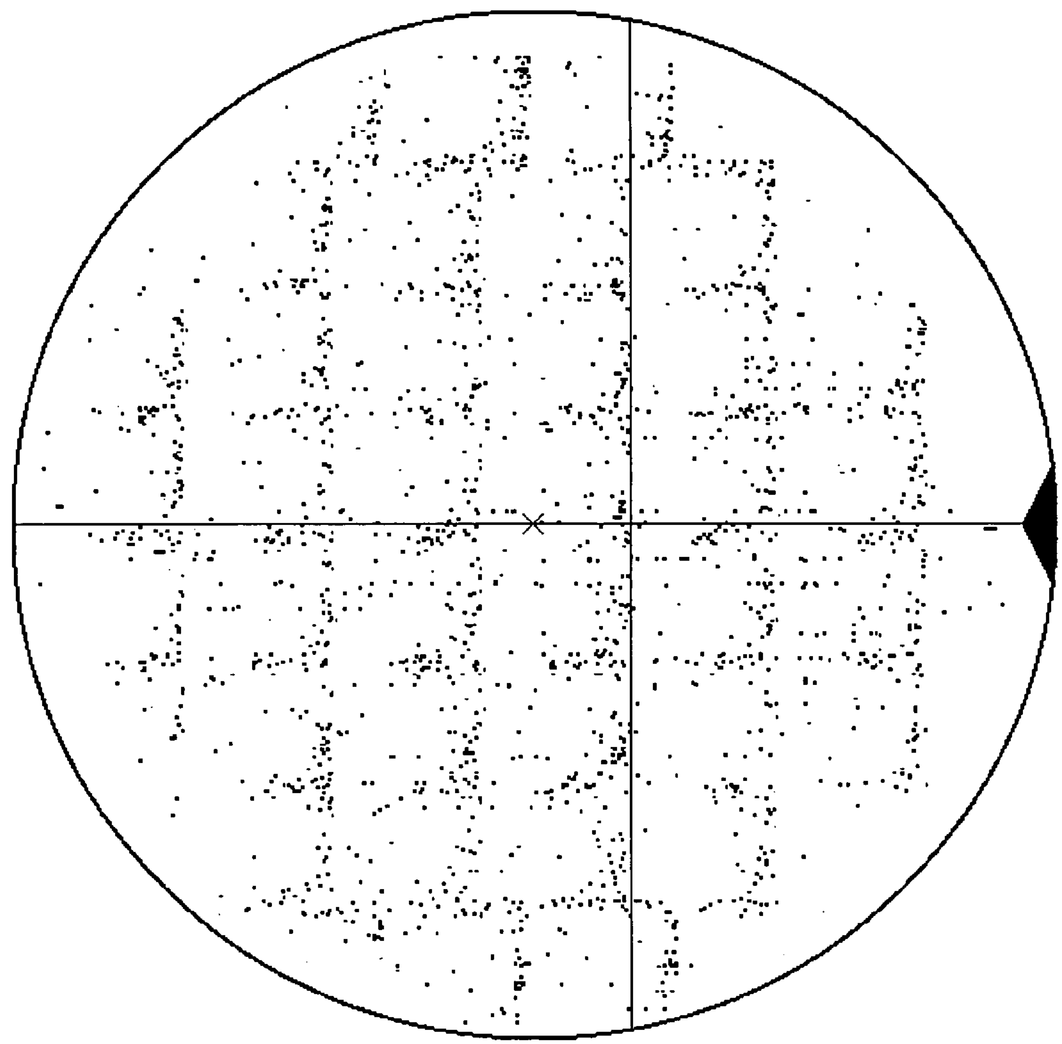

FIG. 8*b* shows a defect wafer map in which the defeats are distributed in a pattern that corresponds to reticle fields, according to an embodiment of the present invention.

Figure 8C:
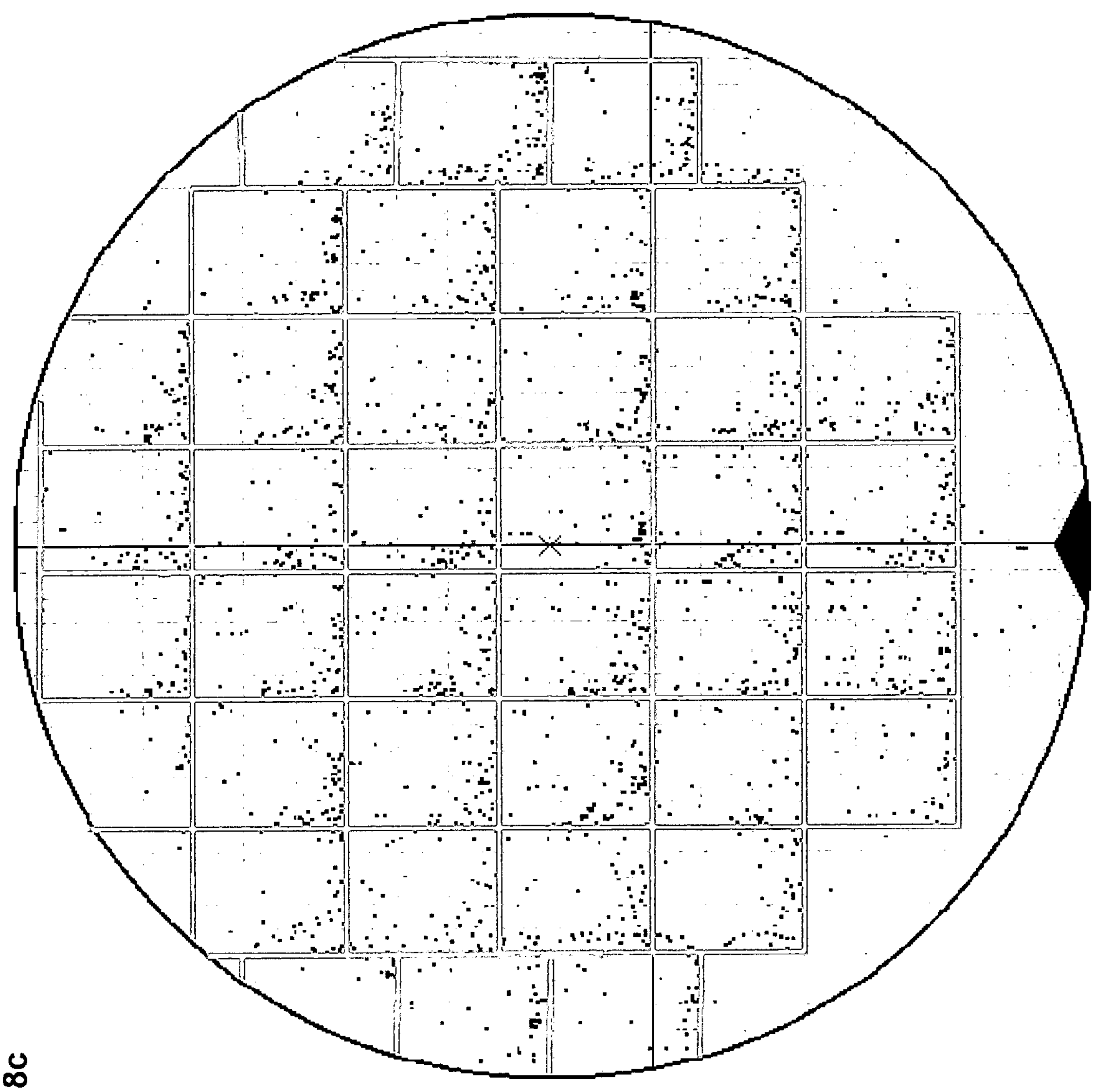

FIG. 8*c* shows the reticle fields overlaid onto the wafer defect map corresponding to FIG. 8*b*, according to an embodiment of the present invention.

Figure 8D:
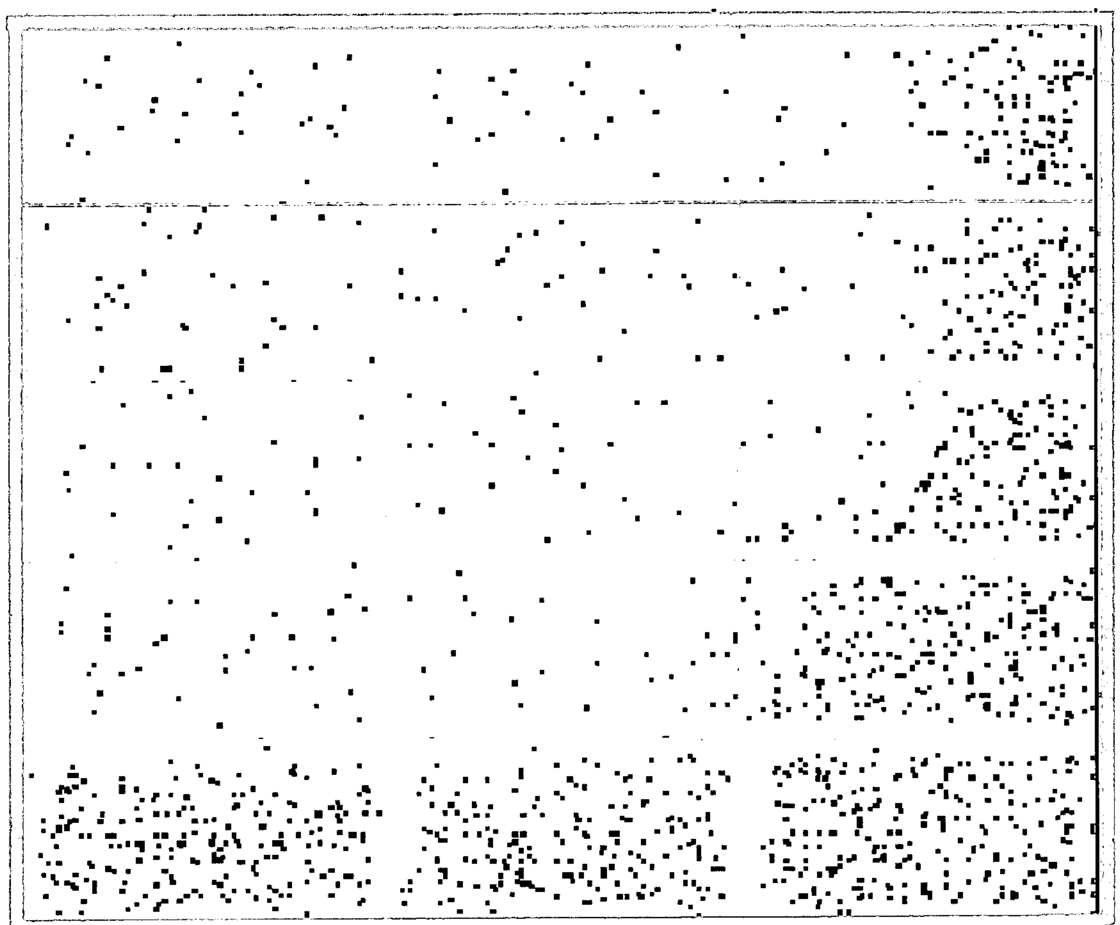

FIG. 8*d* shows a distribution of defects when the defects from all reticle fields are stacked, revealing the non-random defect pattern of FIG. 8*a*, according to an embodiment of the present invention.

Figure 9:
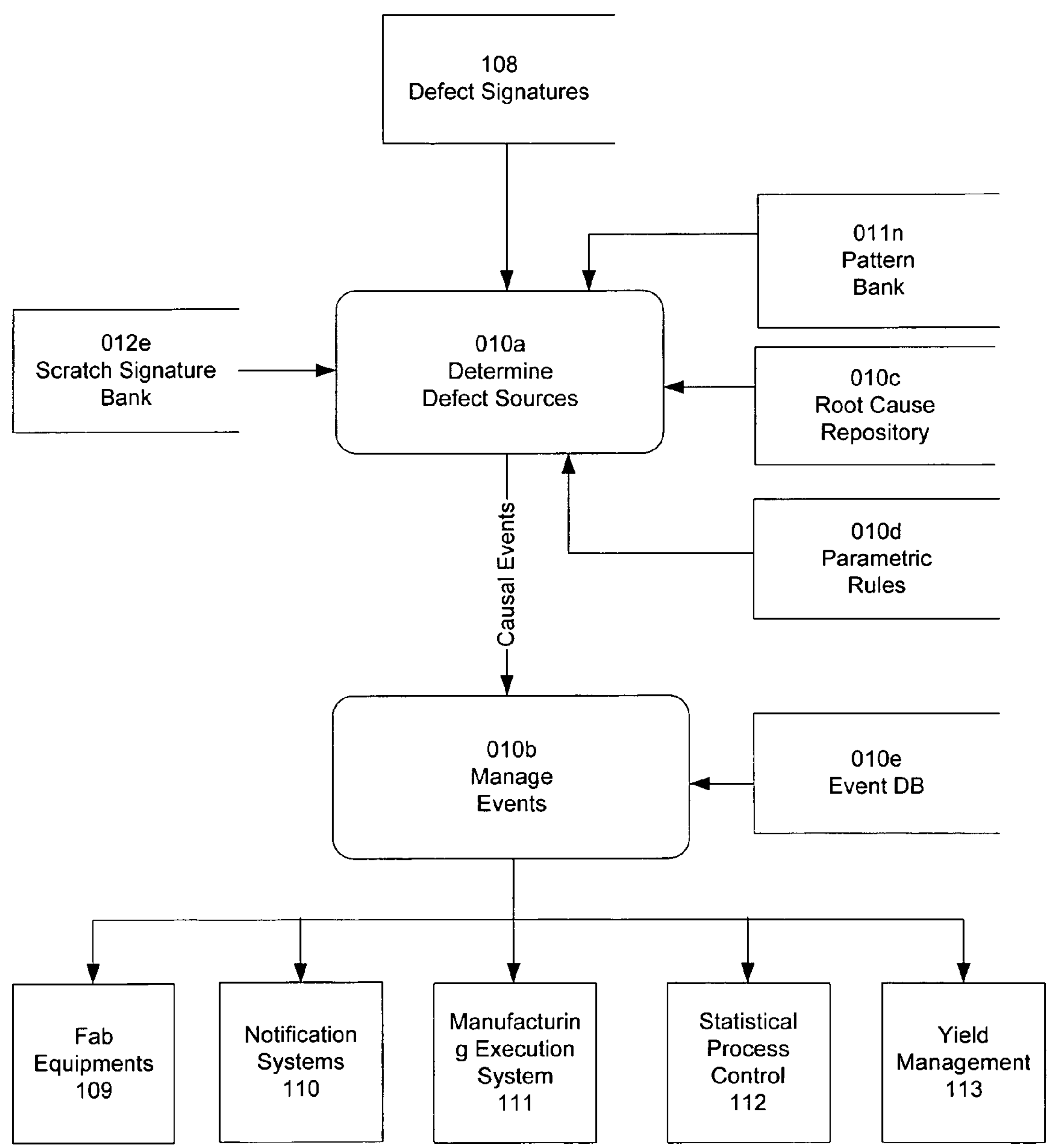

FIG. 9 is a data flow diagram illustrating a method for intelligent process control, according to an embodiment of the present invention.

Figure 10:
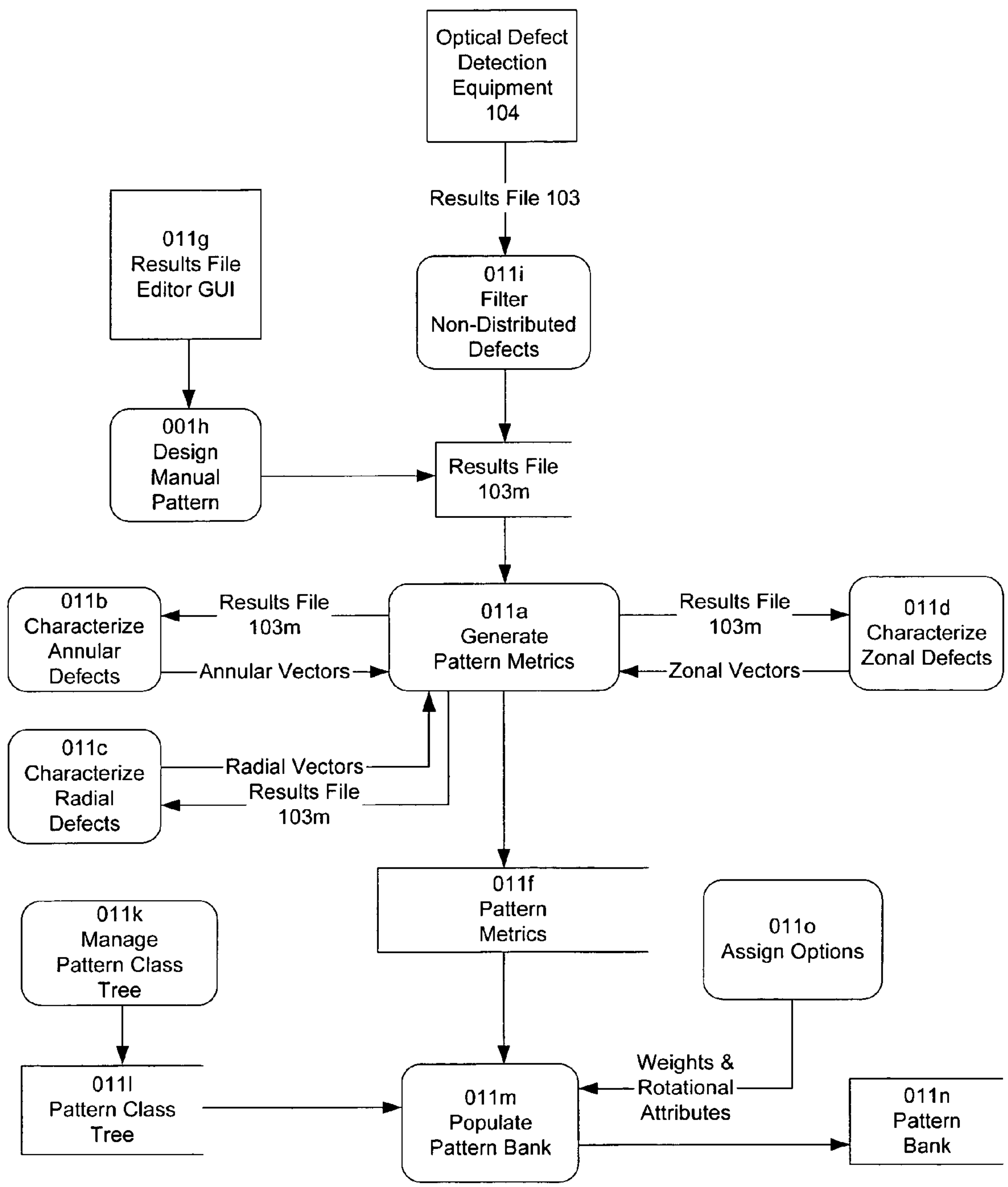

FIG. 10 is a data flow diagram illustrating a method for generating a pattern bank, according to an embodiment of the present invention.

Figure 10A:
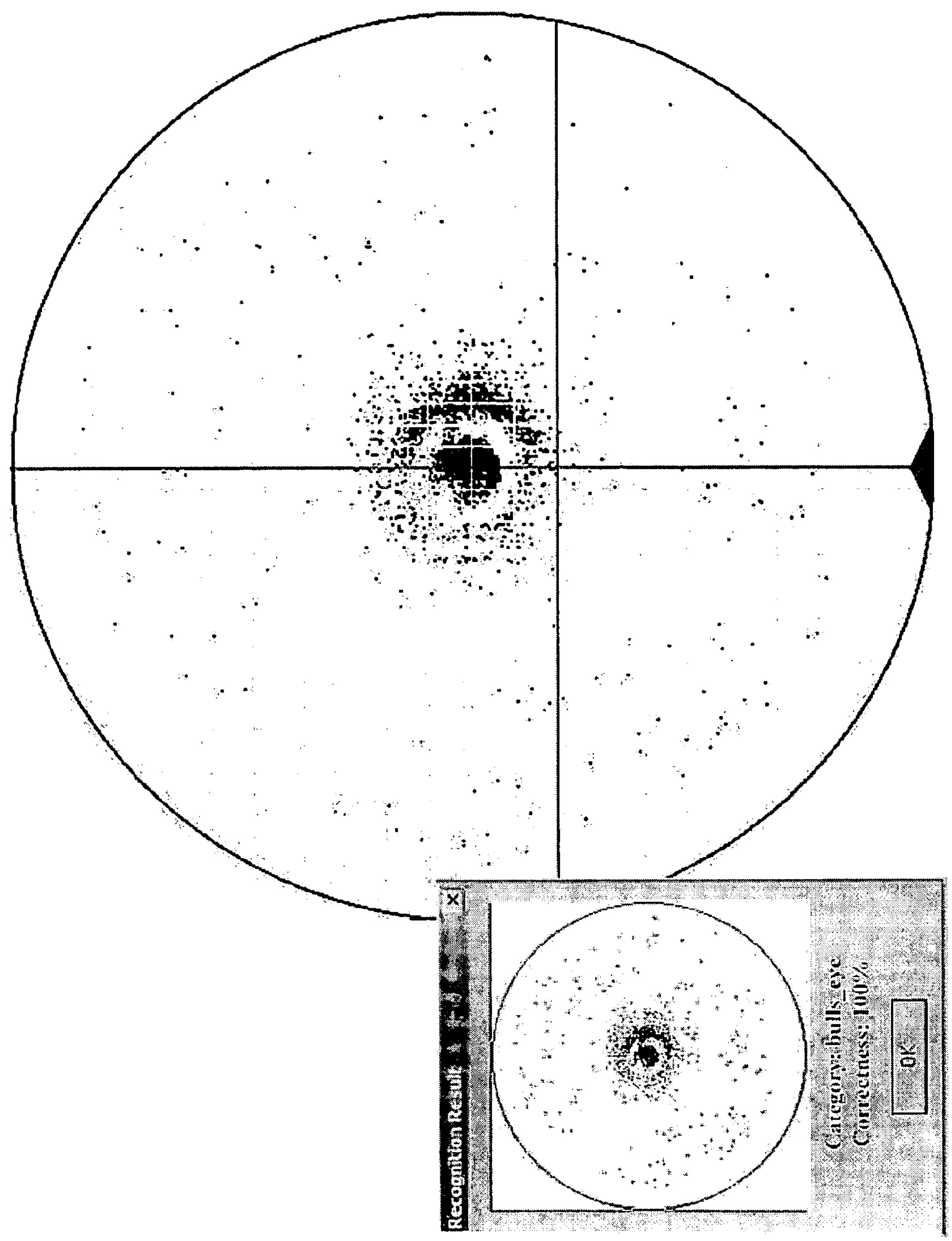

FIG. 10*a* illustrates a particular pattern in the "bull's eye" pattern class of the pattern bank, according to an embodiment of the present invention.

Figure 10B:
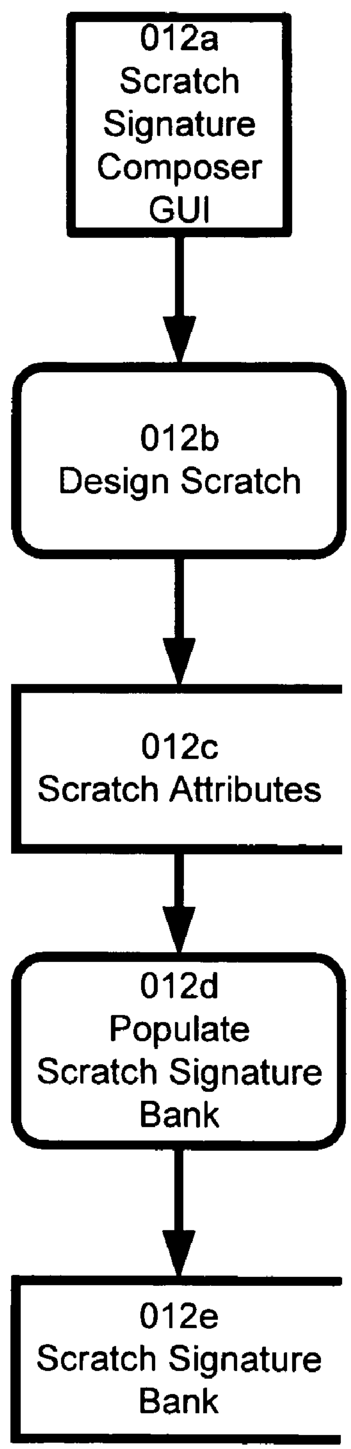

FIG. 10*b* is a data flow diagram illustrating a method for generating a scratch pattern bank, according to an embodiment of the present invention.

Figure 11:
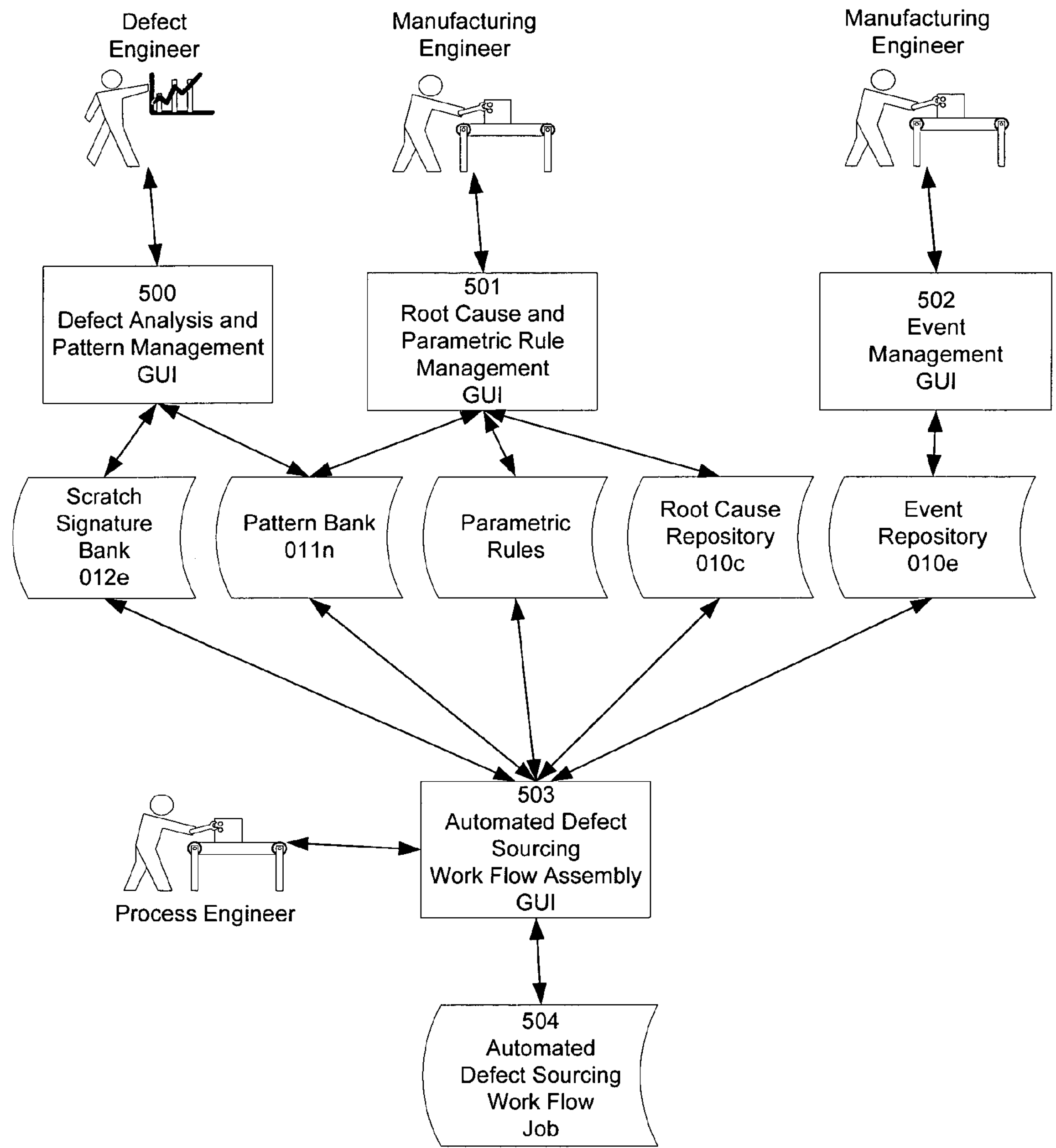

FIG. 11 is a diagram illustrating the GUI components of the automated defect sourcing system, according to an embodiment of the present invention.

Figure 11A:
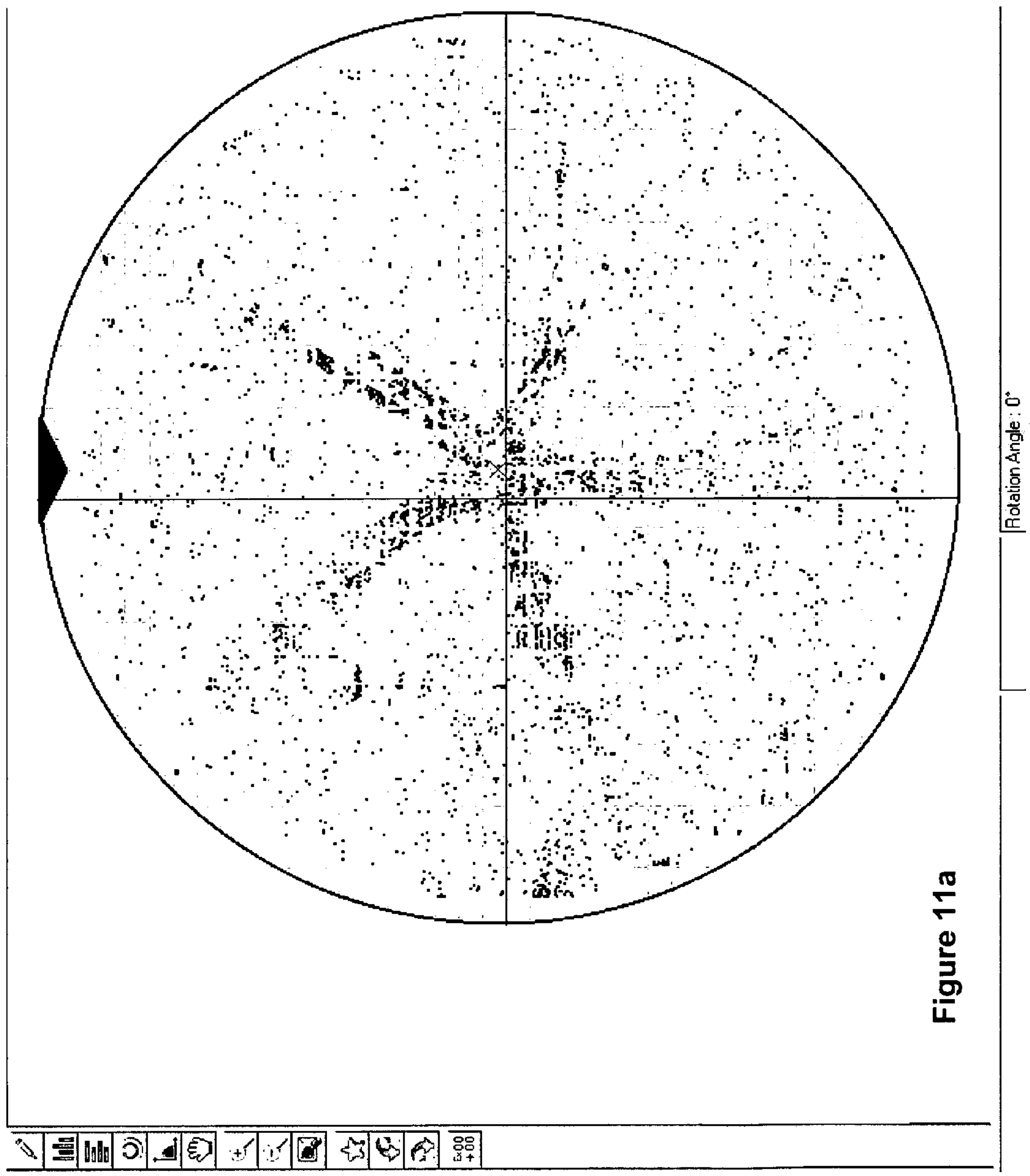

FIG. 11*a* shows an example defect analysis and pattern management GUI 500, according to an embodiment of the present invention.

Figure 11B:
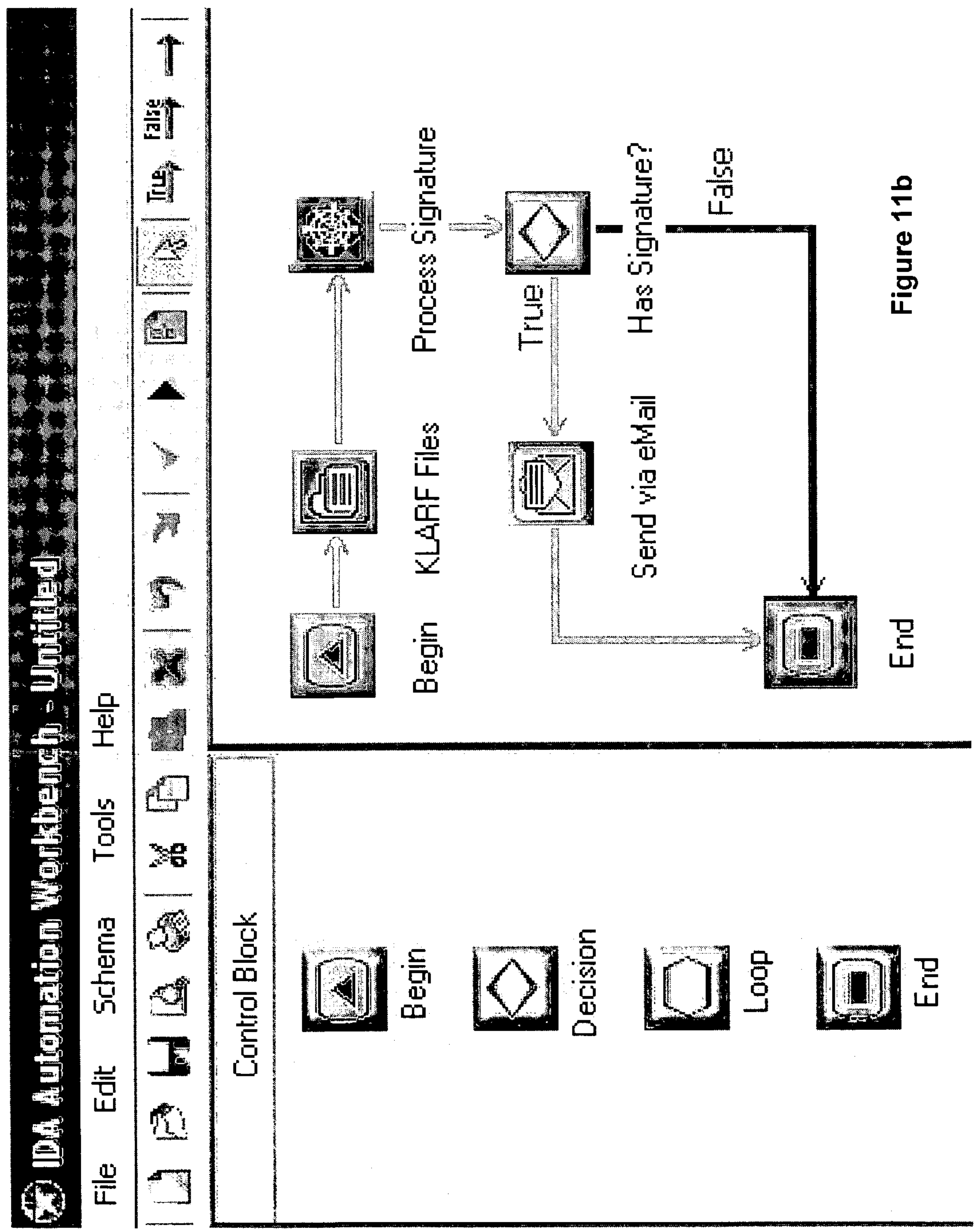

FIG. 11*b* shows an example GUI for an automated defect sourcing work flow assembly 503, according to an embodiment of the present invention.

DETAILED DESCRIPTION

The following definitions serve as a glossary of terms as used herein:

Defect: A pit, tear, groove, inclusion, grain boundary, or other surface feature anomaly that is either characteristic of the material or a result of its processing and that is not a result of the sample preparation. (examples: particle deposited on substrate; scratch/streak on wafer; lithographic error; non-uniform deposition, etch or planarization; excessive or inadequate deposition, etch or planarization).

Defect Cluster: A grouping of defects detected on a wafer surface that have commonality in position, size, orientation and/or one or more other measurable attributes.

Concentrated cluster: A dense grouping of non-random defects that comprises micro-clusters, scratch clusters and repeating litho clusters.

Micro-cluster: A grouping of concentrated defects contained totally with a single die. When an envelope is drawn around the micro-cluster, the major axis of the envelope is much smaller than both the length and width of the die. There are four types of micro-clusters: angular micro-scratch, orthogonal micro-scratch, isolated pair micro-scratch and unstructured micro-cluster. An angular scratch is an elongated micro-cluster whose major axis does not parallel either the horizontal or vertical axis of the die coordinate system, within user-defined limits. An orthogonal micro-scratch is an elongated micro-cluster whose major axis parallels either the horizontal or vertical axis of the die coordinate system, within user-defined limits. An isolated pair micro-scratch is a micro-cluster of two defects that lie in very close proximity and whose next nearest neighbor is more than an order of magnitude farther away. An unstructured micro-cluster is a micro-cluster of three or more defects whose envelope is not elongated.

Repeating Litho cluster: A grouping of concentrated defects that is distributed into several smaller clusters. The source of the defect is related to the wafer lithography process, which includes stepper and the reticle; therefore, the location of defect cluster within the reticle field or die is non-random.

Repeating Die Defect: A defect or group of defects that have the same X/Y die coordinate location within limits as defined by rules parameter 008*d*. Rules parameter 008*d* may also define the minimum number of repeating defect occurrences to consider the identified defects as repeating.

Repeating Reticle Field Defect: A grouping of non-random defects that are located in the same area of a reticle field and which cause the distribution of defects within a stacked reticle field to be non-uniform.

Scratch: On semiconductor wafers, a shallow groove or cut below the established plane of the surface, with a length to width ratio greater than 5:1. [ASTM F1241]

Scratch cluster: A grouping of concentrated defects that comprise a scratch (see definition) and that spans multiple die. When an envelope is drawn around the scratch cluster, the envelope shape is very elongated; however, the position and orientation of the cluster is such that it is NOT radial or annular (see definitions). There are two types of scratch clusters: random and patterned.

Patterned scratch: A classification of scratch defect clusters; Patterned scratches are comprised of multiple scratch clusters that are arranged in a recognizable pattern.

Random scratch: A scratch cluster that may appear on the wafer in various locations and orientations. A random scratch is often the result of a handling scratch and may be classified as a linear, curved or zigzag.

Linear cluster: A classification of scratch defect clusters; the envelope shape drawn around the linear cluster can be approximated by a high aspect ratio rectangle or triangle (e.g. length to width ratio greater than 5:1).

Curved cluster: A classification of scratch defect clusters; the envelope shape drawn around the curved cluster can be approximated by a partial ring.

Poly-line cluster: A classification of scratch defect clusters; the envelope shape drawn around the curved cluster can be approximated by a multi-segment line.

Distributed Defect Cluster: A grouping of defects that cover a significant portion of the wafer. This grouping includes annular clusters, radial clusters, zonal clusters and random clusters.

Annular Defect Cluster: A grouping of distributed defect clusters. Annular clusters are distributed in a ring pattern equal distance from the center of the wafer. An annular cluster may be comprised of two or more rings (e.g. a "bull's eye").

Radial Defect Cluster: A grouping of distributed defects. Radial clusters are distributed along lines emanating from the center of the wafer. A radial signature may also include a concentration of defects in the center of the wafer. Examples of radial clusters are starfish.

Zonal Defect Cluster: A grouping of distributed defects that span multiple dies; zonal clusters are the least well-defined; they may be characterized by location, shape, orientation, density distribution and relationship to other clusters. There are two classifications of zonal defect clusters: fixed position and floating.

Random Defect Cluster: A grouping of distributed defect clusters. A random distribution of defects over the wafer surface is uniform and the defect k-NN distribution is normally distributed (i.e. Gaussian).

Artifact: A physical attribute of the substrate detected or indicated by the inspection equipment or metrology equipment as different from the nominal or expect condition of the substrate (for example, a defect or a film thick variation).

Figure 1:
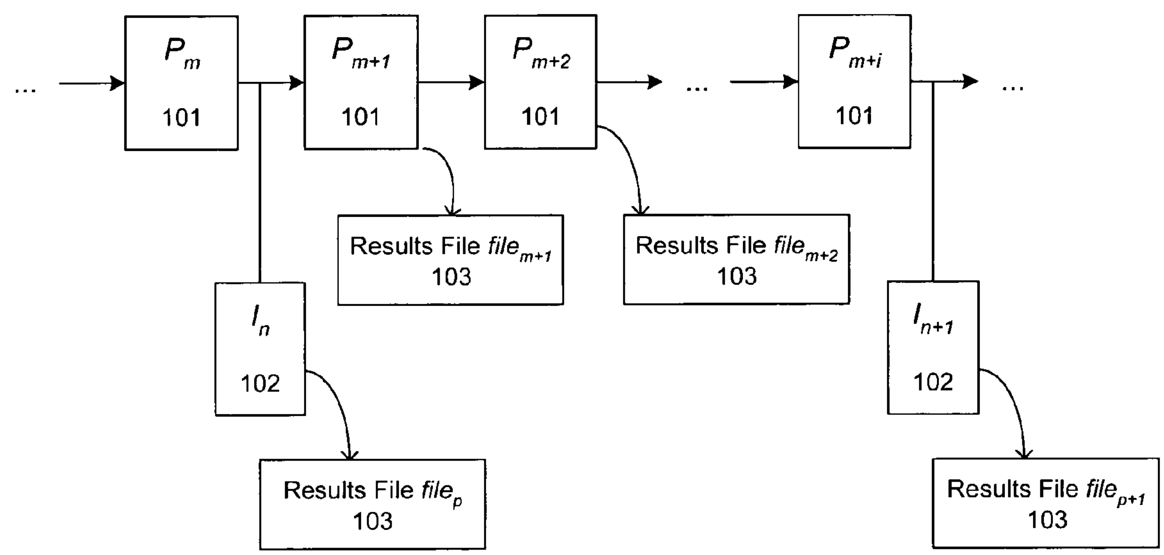

Inspection Equipment: Equipment used by a manufacturer to identify defects, artifacts and/or anomalies on a substrate surface and/or below a substrate surface. Inspection equipment may be stand-alone or it may be integrated into the process equipment (i.e. in situ). Refer to FIG. 1.

Metrology Equipment: Equipment used by manufacturers to measure topography, morphology, film thickness and/or other physical attributes of the substrate surface and/or attributes that appear below the substrate surface. Metrology equipment may be stand-alone or it may be integrated into the process equipment (i.e. in situ). Refer to FIG. 1.

Results File: The output file (such as a text file, digital image file or wafer map) from the inspection equipment or the metrology equipment. Inspection equipment results files define or indicate the coordinate location, size, type and/or other attributes of defects, artifacts or anomalies (examples: KLA results file, Scanning Electron Microscope image, wafer bin map, digital image of wafer surface, etc.). A metrology equipment results file indicates physical attributes at various points over the wafer surface. Examples are film thickness uniformity maps, wafer reflectivity maps, etc.

Wafer Defect Map or Substrate Defect Map: A display of defect information corresponding to defect coordinate locations on the wafer or substrate surface.

Micro-scratch: A scratch (not necessarily micron-scale) that is not visible to the unaided eye under fluorescent (diffuse) illumination but is visible to the unaided eye under incandescent (high intensity) illumination. [ASTM F1241]

Defect Signature: A pattern or collection of patterns that are consistently created by a degradation, excursion or malfunction in a specific manufacturing process step.

Defect k-NN distances: The physical distance between a defect and its "k" closest neighbors, where k is an integer value.

FIG. 1 is a block diagram illustrating example processing and inspection steps in a semiconductor fabrication line, according to an embodiment of the present invention. Processing steps 101 proceed with fabricating a wafer, and inspection steps 102 examine one or more intermediate fabrication results of the processing steps 101. In the example shown in FIG. 1, inspection steps $I_n$ and $I_{n+1}$ 102 examine results of the intermediate processing steps $P_m$ and $P_{m+i}$ 101 (respectively), and produce inspection equipment results files $file_p$ and $file_{p+1}$ 103 (respectively). Also shown in FIG. 1 are integrated (in situ) inspections performed by intermediate processing steps $P_{m+1}$ and $P_{m+2}$ producing results files $file_{m+1}$ and $file_{m+2}$ 103 (respectively). Inspection steps are preferably performed using optical, scanning electron microscope (SEM) or sensory defect detection equipment 104 (Shown in FIG. 2), which may be either inline or integrated (in situ).

Figure 1A:
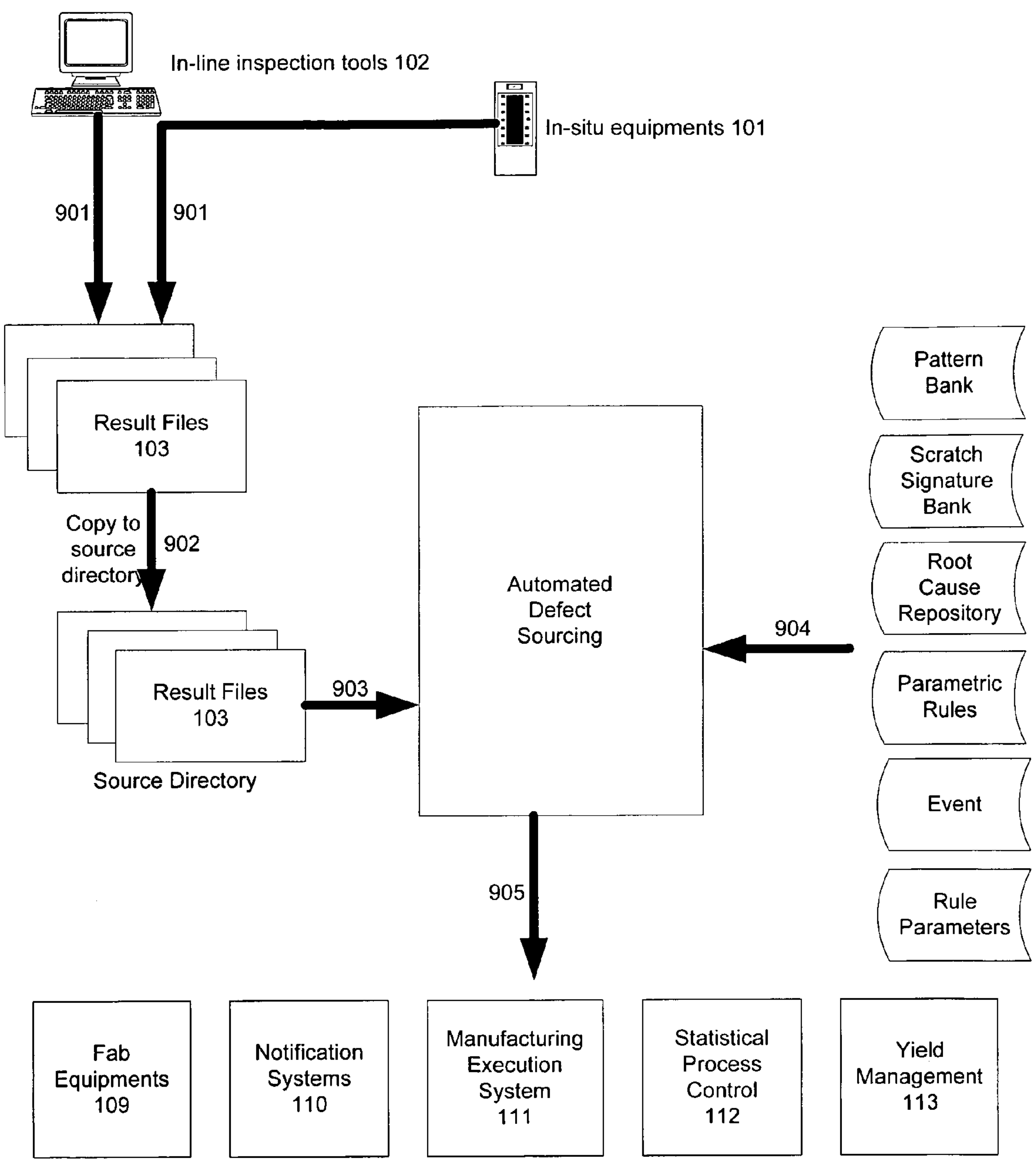

FIG. 1*a* is a diagram illustrating inputs and outputs of the automated defect sourcing system, according to an embodiment of the present invention. One or more results files 103 are produced 901 by a semiconductor processing inspection step 102 or an integrated (in situ) inspection performed by an intermediate processing step 101, in order to extract and/or recognize one or more defect signatures pointing to one or more anomalies or malfunctions in the processing steps 101 (preceding the respective inspection step 102) as the source of the defects. Results files 103 are moved 902 to a control source directory. Automated defect sourcing system preferably scans 903 the source directory for new results files 103 to be processed. Automated defect sourcing system compares 904 new results file 103 with pattern bank 011*n*, root cause repository 010*c*, parametric rules (described below) and event database 010*e*, and sends 905 a message to fabrication equipment 109, an alert using a fabrication plant notification system 110, a notification to a Manufacturing Execution System 111, a notification to an SPC system 112, and/or a notification to Yield Management 113, as described below.

As defined above, an inspection equipment results file 103 (a) identifies defects for in-line defect inspection based on input from inspection equipment results file 103 (e.g., KLA results file), or (b) identifies defects for in situ inspection based on input from inspection equipment results file (e.g., KLA results file), or (c) identifies defects for in-line defect inspection based on input from a digital image file from inline inspection equipment, or (d) identifies defects for in situ inspection based on input from a digital image file integrated (in situ) inspection.

To input a digital image file from inline inspection equipment or in situ inspection equipment in the present invention requires that the image be parsed and interpreted, as follows:

1. Digital image file—To support in situ wafer inspection or inline inspection equipment, the preferred digital image format used is FITS (Flexible Image Transport System). FITS is the standard data interchange format used in astronomy and allows storing scientific data sets comprising multidimensional arrays and 2-dimensional tables having rows and columns of data. In addition to FITS, the present invention supports standard digital file formats, such as JPEG, GIF, TIFF and BMP.
2. Wafer Layout—The user may provide wafer layout information for generating a wafer map and for performing reticle and die stacking analysis (described below). The wafer layout information comprises wafer size, wafer flat (or notch) orientation, die size and locations and/or reticle size and locations. If no wafer layout information is provided by the user, a default value is used for wafer size (e.g. 200 mm) and wafer orientation (e.g. notch down).
3. Coordinate Transformation—The present invention aligns the coordinate system of the digital image input with the wafer coordinate system (as specified in wafer layout information or default values). The system scans the digital image to identify the wafer edge and the wafer flat (or notch) orientation; it then scales, translates and/or rotates the digital image coordinate system so that it is aligned with the wafer coordinate system. If no wafer layout information is provided by the user (e.g. an unpatterned wafer), the system selects a default wafer size and orientation, in which case die placement information is not shown on the wafer map.
4. Digital image interpreter—The user may set one or more threshold values to establish multiple defect bins for isolating or enhancing a particular defect signature. Image pixels with grey levels below the minimum specified threshold value are interpreted as "no defect", while pixels above the minimum threshold value are assigned an X, Y location and a defect type based on the grey scale value and any user-defined threshold values. Alternatively, the user may assign a defect size value for a bin. Non-contiguous bins may be assigned the same defect type (including "no defect"). If no threshold values are specified by the user, the system will automatically set threshold values based on a user-defined preference for the number of threshold values (default is two threshold values) and an automated grey scale analysis of the image.

An embodiment of the present invention allows for the filtering of a results file 103 in order to enhance a defect signature embedded in the file. Several attributes are available for the filtering function, for example: a distance of a defect to its nearest neighbor (or more generally to its k nearest neighbors), defect size, defect classification, spatial classification, spectral frequency and/or intensity (e.g. gray scale or chromatic scale level) of a defect as given by the results file 103, etc.:

1. Filtering by k-NN—After determining the k-nearest neighbor distance for one or more defects, the user may desire to eliminate highly concentrated and/or highly distributed defects. The values for the k-NN filter may be based upon the typical defect distribution for the process that is being evaluated.
2. Filtering by Defect Size and Classification—Information about the size and classification of a defect may be indicated by the inspection equipment results file 103. A particular process fault may generate defects that fall within a specific size range or classification. Therefore, limiting the pattern recognition function to defects in the specified range may improve the correlation with a trained signature. A single inspection equipment results file 103 may be filtered several times.
3. Filtering by Spectral Frequency and/or Intensity—Information about the spectral frequency and/or intensity of a defect may be indicated by an inspection equipment results file 103. A particular process fault may generate defects that fall in a specific spectral frequency range or intensity; therefore, limiting the pattern recognition function to defects in the specified spectral or intensity range may improve the correlation with a trained signature. A single inspection equipment file may be filtered several times.
4. Filtering Spatial Classification—After determining the annular, radial or zonal defect pattern, the user may desire to eliminate a certain spatial classification of highly concentrated and/or highly distributed defects. For example, the user may exclude the outer ring of defects based on the annular distribution for the process that is being evaluated.

FIG. 2 is a data flow diagram illustrating a method for automated defect sourcing, according to an embodiment of the present invention. Obtain results file 103 from optical, SEM or sensory defect detection equipment 104 and analyze 001 the corresponding wafer map to detect one or more signatures 108 for further investigation, wherein the signatures 108 represent potential defects in the wafer as a result of anomalies or malfunctions in the processing steps. (Analysis 001 is described below and shown in FIG. 3.) FIG. **2*a* shows an example wafer defect map, wherein a point represents a defect and wherein the corresponding results file 103** would indicate defect coordinates.

If analysis 001 results in detection of no such potential defect signatures 108, store 002 the results file 103 and a flag 106 in repository 003 for further processing, wherein the flag 106 indicates that analysis 001 detected no potential defect signatures 108, and wherein the further processing comprises examining a stack of multiple inspection equipment results files (described below).

If, on the other hand, analysis 001 does result in the detection of a potential defect signature 108 (indicated by flag 107), the results file 103 is processed to classify 004 the detected defect signature 108 (described below and shown in FIG. 4). The classification 004 is described below in FIG. 4. Preferably, defect signature classification 004 also passes detected defect signatures 108 for generating 010 one or more events based on the detected defect signature 108, wherein the events comprise sending 109 a signal to a piece of fabrication equipment to provide feedback or feed-forward adjustment or correction to the equipment or to suspend operation of the equipment, sending 110 an alert using an existing fabrication plant notification system to contact a designated individual via pager, phone or email, notifying 111 a Manufacturing Execution System (MES, described below), notifying 112 SPC to adjust the sampling plan for a particular wafer lot, and/or notifying 113 Yield Management personnel that a particular defect signature has been detected.

A Manufacturing Execution System preferably tracks the work in process (WIP) and comprises route and process definitions, and optionally handles dispatching of materials, real time scheduling, recipe delivery to process equipment and equipment control. In an automated system, while the MES interacts with process equipment via a station or cell controller, the present invention analyzes and detects signatures of out-of-control conditions. Using the event-driven system, the present invention triggers one or more of the following events: send a message and/or warning, send an email, cause an alert, put a manufacturing lot on hold, shut down equipment, change a recipe, etc.

Figure 3:
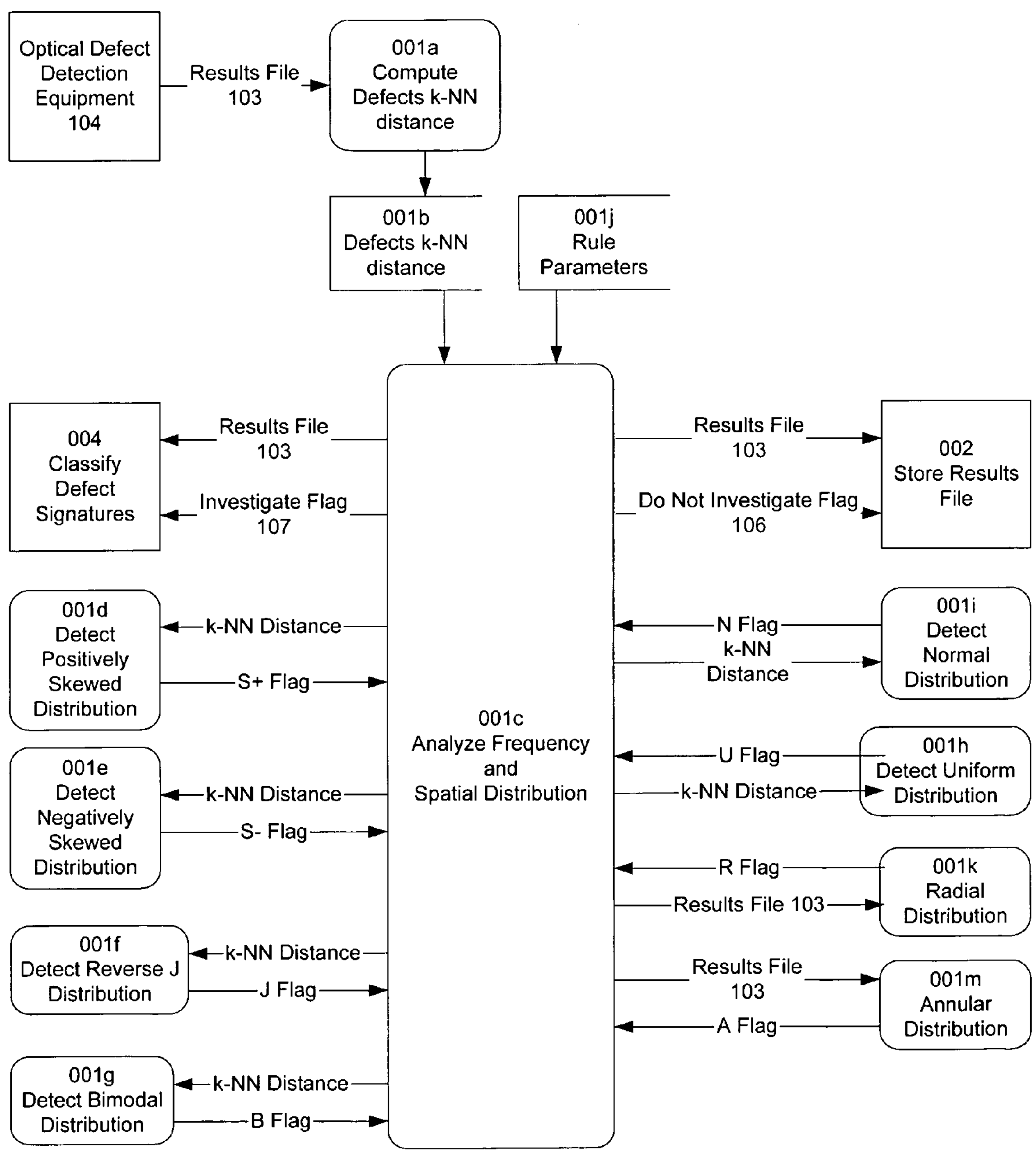
Figure 3A:
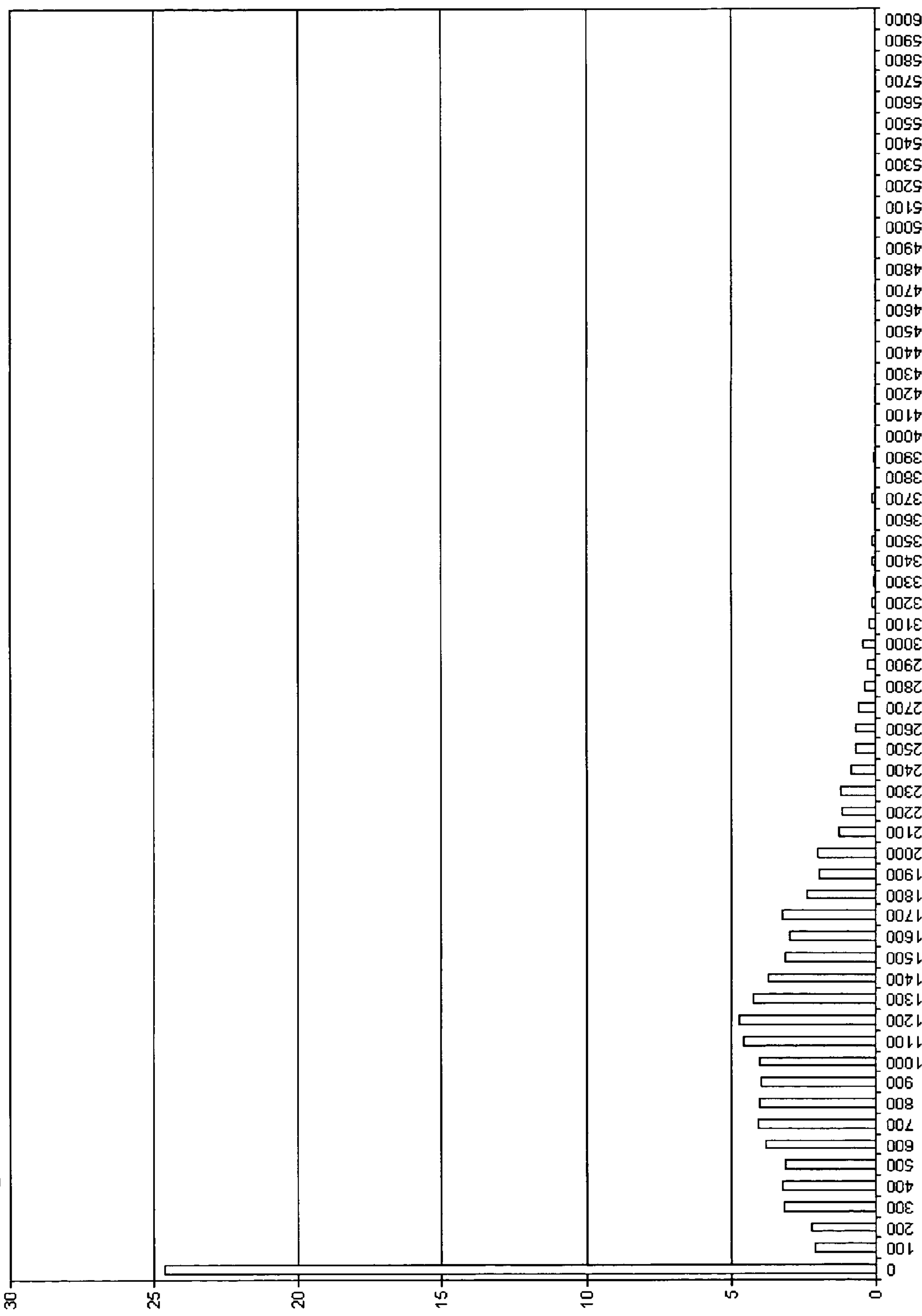

FIG. 3 is a data flow diagram illustrating a method for detecting a defect pattern which has been identified as a candidate for further analysis 001, according to an embodiment of the present invention. Compute 001*a* and store 001*b* the k-NN distances of the defects points given by the results file 103 obtained from the optical defect detection equipment 104, wherein preferably k=1, and analyze 001*c* the frequency distribution of the computed k-NN distances. Optionally, set k>1 when it is desirable to separate out defect clusters that comprise a large number of defects. FIG. 3*a* shows an example histogram of the defect k-NN distances of the results file 103 corresponding to the defect pattern of FIG. 2*a*, the histogram showing a concentrated grouping of defects with k-NN distance below 100 μm and a distributed grouping of defects with the mean around 1200 μm. Since the distribution of k-NN distances will not necessarily be a perfectly normal distribution, and the spatial distribution of defects will not necessarily be perfectly flat, the rule parameters 001*j* specify how close to normal the distribution should be in order for the k-NN distances distribution to be considered random, and how close to flat the spatial parameters should be in order to be considered uniform. These rules parameters will be set in default values or may be defined by the user in a recipe. The following represent example statistical measures for the k-NN frequency distribution analysis 001*c:*

1) detecting 001*d* a positively skewed distribution;
2) detecting 001*e* a negatively skewed distribution;
3) detecting 001*f* a reverse-J distribution;
4) detecting 001*g* a bimodal distribution;
5) detecting 001*m* an annular distribution;
6) detection 001*k* a radial distribution;
7) detecting 001*h* a uniform distribution; and
8) detecting 001*i* a normal distribution.

Figure 3B:
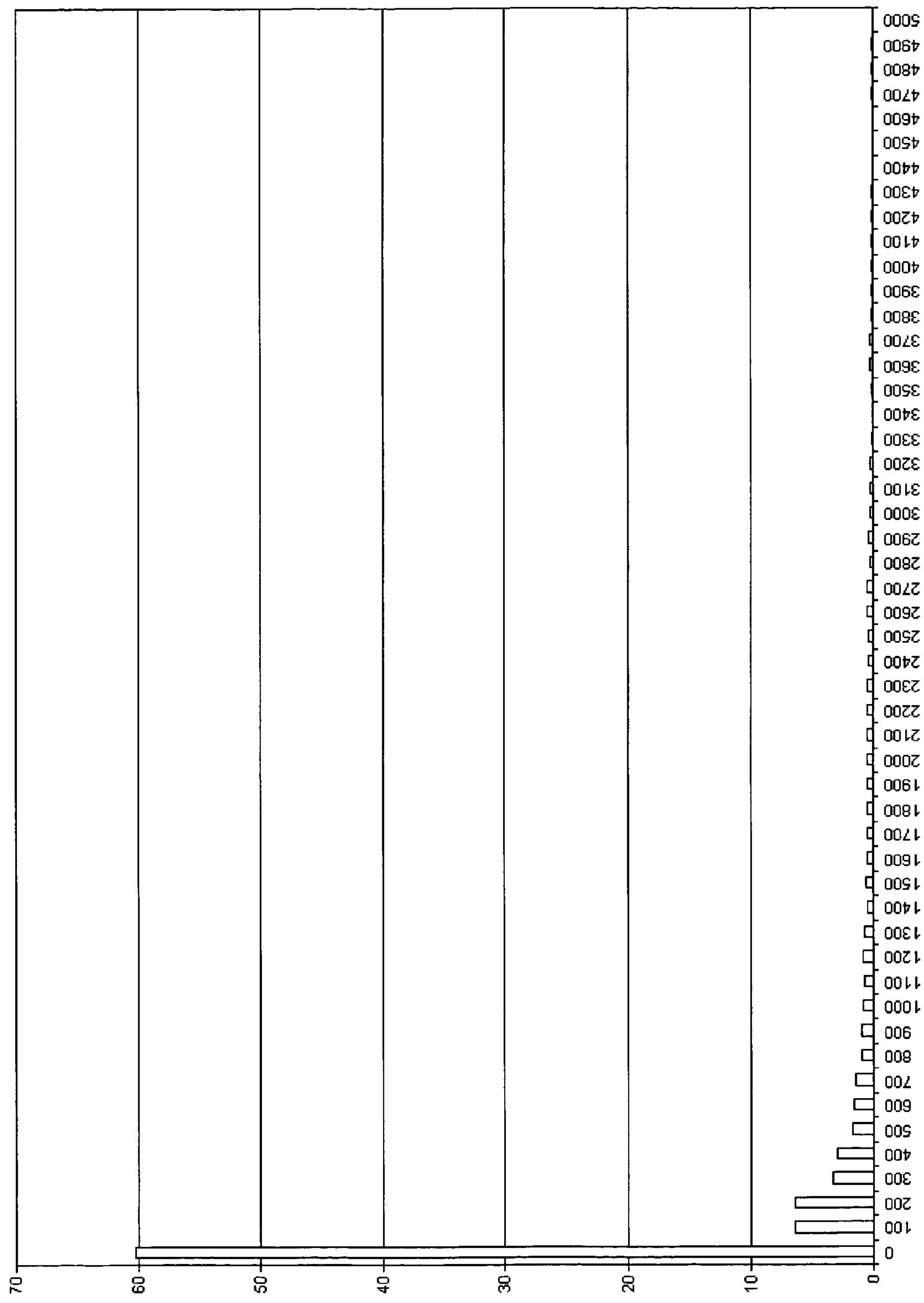
Figure 3C:
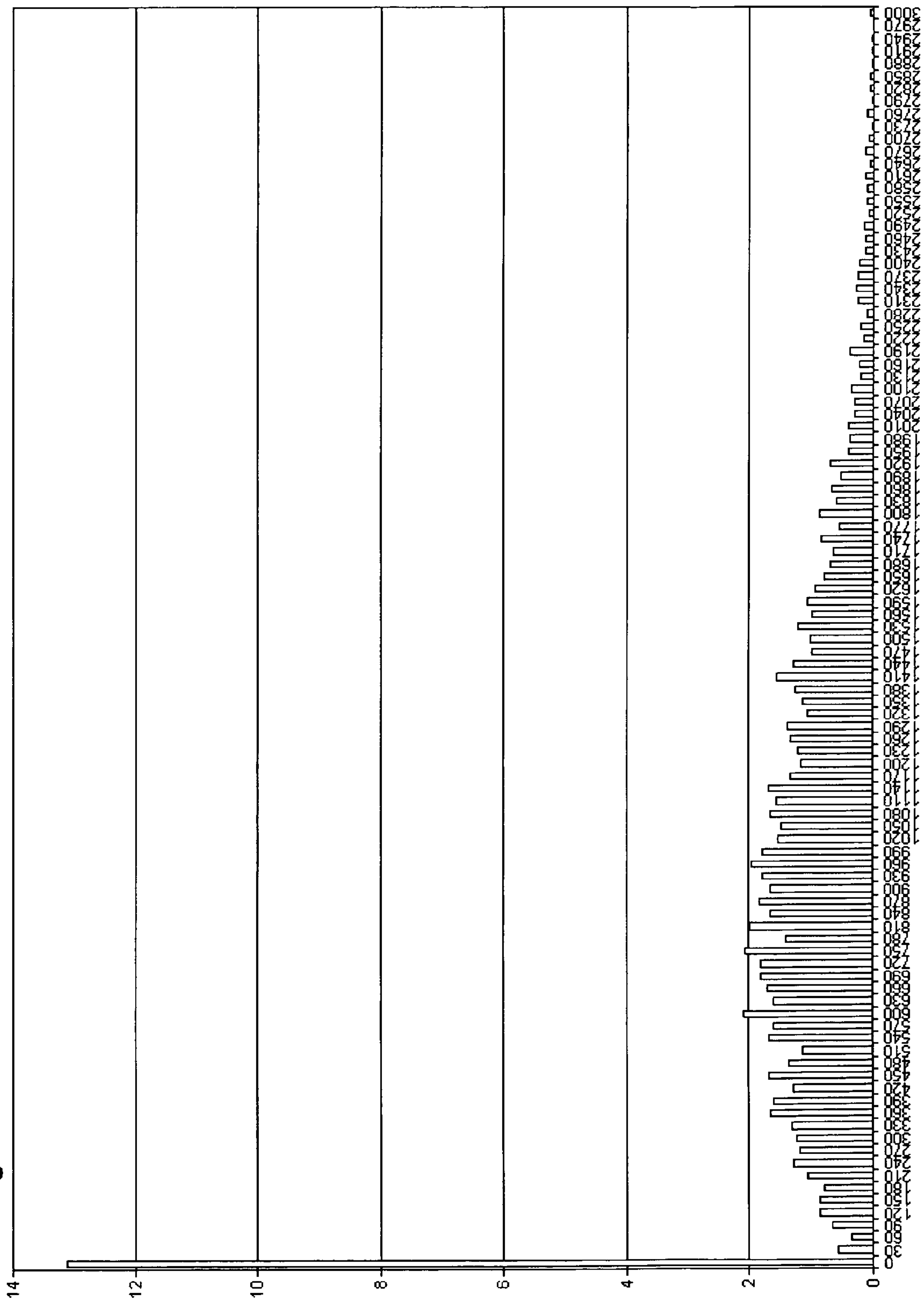
Figure 3D:
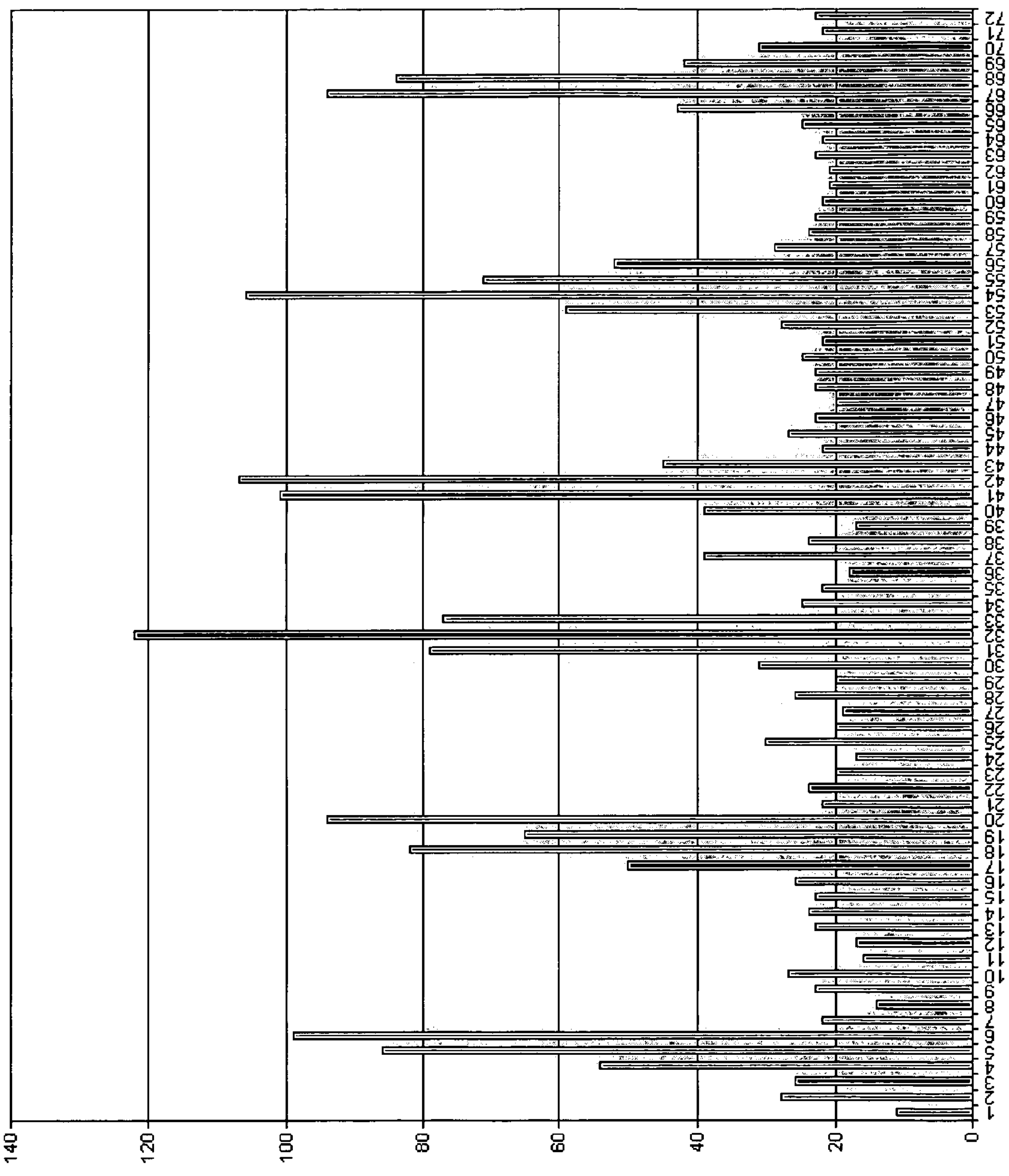
Figure 3E:
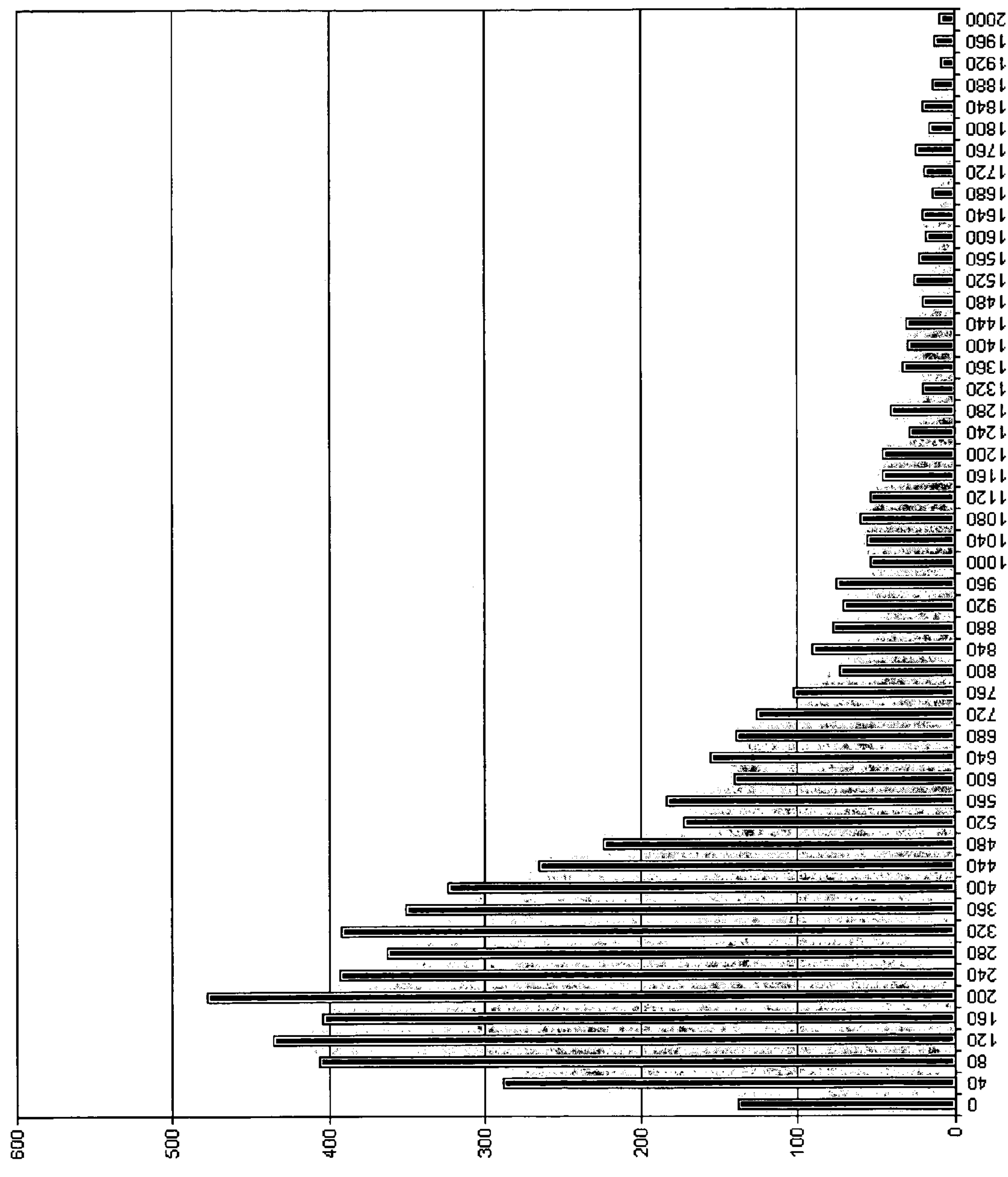

Note that items 1 through 4 and 7 through 8 apply to the k-NN frequency distribution and items 5 and 6 apply to analyzing the spatial defect distribution. If one or more of the above detect sufficient deviation in the frequency and spatial distributions from a random distribution (as specified by a confidence interval in the rules parameters 001*j*), the corresponding results file 103 is flagged for classification 004 as described above. Example distribution of frequency and spatial distribution histograms are shown, with FIG. 3*b* showing a reverse-J distribution, FIG. 3*c* showing a bimodal distribution, FIG. 3*d* showing a radial distribution, and FIG. 3*e* showing a skewed distribution.

Figure 4:
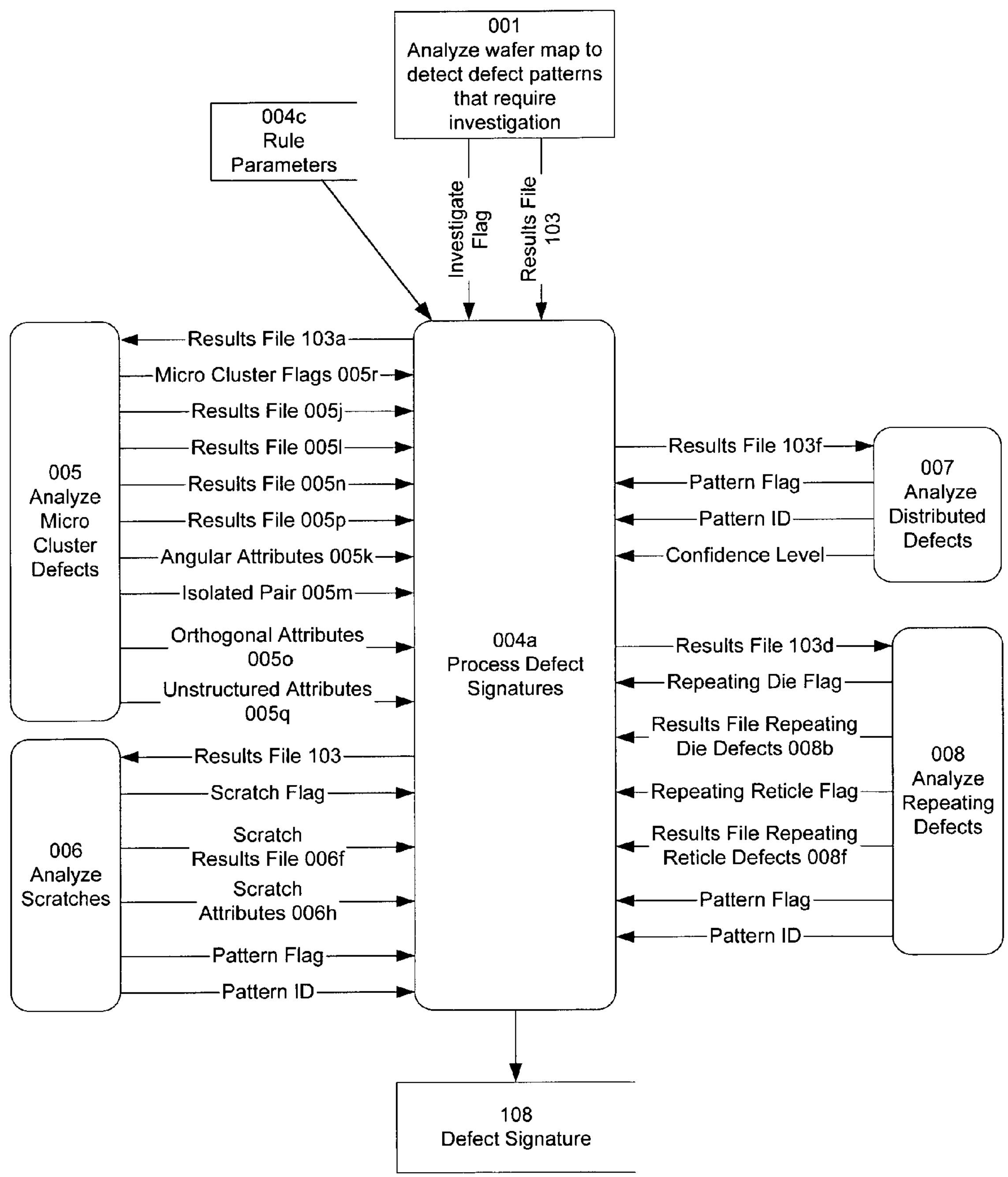
FIG. 4 is a data flow diagram illustrating a method for detecting and classifying a defect signature, according to an embodiment of the present invention.

FIG. 4 is a data flow diagram illustrating a method for classifying a defect signature, according to an embodiment of the present invention. Results file 103 is flagged by the analysis 001 process for defect signature classification. Classification 004 of a defect signature 108 comprises the following separate analyses:

1) analyzing 005 micro-clusters on the wafer;
2) analyzing 006 scratches on the wafer;
3) analyzing 007 distributed defect signatures; and
4) analyzing 008 repeating defects.

Each of the above four is described separately below. A user recipe defines the analysis process managed by 004*a*. A user recipe indicates which classifications of defect signatures to analyze for in a results file 103, and/or whether to exclude any identified defects from the analysis (and if so, which identified defects to exclude). It is an advantageous aspect that the analysis processes 005 through 008 proceed sequentially and as defined by a user recipe, with the processes isolating one or more types of defects and progressively filtering out the identified defects from the results file 103 before passing on the filtered results file to the next analysis process. It is noted that a tradeoff between thoroughness and time exists, wherein a more thorough analysis is lengthier than a less thorough analysis. For example, if a quick (but less thorough) analysis is desired a user recipe may skip portions of the defects signature libraries and/or some defect types, whereas if a more thorough (but lengthier) analysis is desired a user recipe may choose several different parameters to filter a results file using the same defect signature.

Following is an example of such a sequential analysis as given by an example user recipe. First, 004*a* sends the original results file 103 to 006 for identification and isolation of large scratches (i.e. scratches spanning multiple dies). Then 004*a* filters the identified large scratches from the original results file 103 and sends the resulting "delta" results file 103*a* to 005 for isolation and identification of micro-clusters, wherein 005 characterizes the identified micro-clusters as orthogonal micro-scratches, angular micro-scratches, isolated pair micro-scratches and unstructured micro-clusters. Based on the work flow recipe (rules parameters for 004*a* are defined in 004*c*) 004*a* processes each of the micro-cluster types, processing is defined by 004*c* and entails one or more functions such as modifying the results file to label certain identified defects as a specified defect class, filtering the indicated defects from the delta results file 103*a*, and/or generating a new delta results file 103*d* based on certain identified defect classes. The work flow recipe may then instruct the analysis process 004*a* to send the processed results file 103*d* to 008 for analyzing repeating defects. 008 isolates and identifies repeating defects in the new processed results file 103*d* and sends the info regarding which defects in the processed results file may be identified as repeating defects to 004*a*. Analysis process 004*a* then filters out the identified repeating defects from the processed results file 103*d*, thereby generating a new processed results file 103*f*, and sends the new processed results file 103*f* to 007 for distributed pattern recognition. It is noted that there may be multiple processed results files 103*f* that may be sent to 007. Analysis process 004*a* will package 108 the known signature information (of above types) and generate the information as defined in the work flow recipe.

FIG. 5 is a data flow diagram illustrating a method for analyzing a defect micro-cluster, according to an embodiment of the present invention. Compute 005*a* and store 005*b* defect k-NN distances (preferably using k=1, optionally setting k>1 when it is desirable to separate out defect clusters that comprise a large number of defects), with the defect coordinates given by the results file 103, or a processed results file, passed from the classification process 004. Rule parameters 005*d* provide a default definition or a user-specified definition for each of the types of micro-clusters (i.e. orthogonal micro-scratch, angular micro-scratch, isolated pair micro-scratch and/or unstructured micro-cluster), by specifying for example the minimum number of defects in each of the types of clusters, the degree of elongation of the defect cluster, the degree of linearity of a micro-scratch, a degree of proximity of the defects to neighboring defects, the width or size of the micro-scratch envelope, a region of the die harboring the defects, etc. Using the computed k-NN defect distances, identify the defect clusters in the processed results file, draw an envelope around the defect clusters to identify the micro-clusters, then do the following:

1. detect 005*g* angular micro-scratches, and produce (a) a results file 005*j* comprising the detected angular micro-scratches and (b) a set of attributes 005*k* for the detected angular micro-scratches;
2. detect 005*h* isolated pair micro-scratches, and produce (a) a results file 005*l* comprising the detected isolated pair micro-scratches and (b) a set of attributes 005*m* for the detected isolated pair micro-scratches;
3. detect 005*f* orthogonal micro-scratches, and produce (a) a results file 005*n* comprising the detected orthogonal micro-scratches and (b) a set of attributes 005*o* for the detected orthogonal micro-scratches; and
4. detect 005*i* unstructured micro-scratches, and produce (a) a results file 005*p* comprising the detected unstructured micro-scratches and (b) a set of attributes 005*q* for the detected unstructured micro-scratches.

FIG. 5*a* shows a wafer defect map that has been identified as having non-random structures. The histogram in FIG. 5*b* shows the defect k-NN distances corresponding to the results file in 5*b*. FIG. 5*c* shows a wafer defect map identifying the defect clusters that correspond to the rules parameters (e.g. defect k-NN distance less than 200 μm, major axis length less than 2 mm, more than 5 defects per micro-cluster), revealing a number of angular micro-scratches in FIG. 5*c* and showing an enlarged view of some of the angular micro-scratches inn FIG. 5*d.*

FIG. 6 is a data flow diagram illustrating a method for analyzing scratches, according to an embodiment of the present invention. Compute 006*a* and store 006*b* k-NN distances (preferably using k=1, optionally setting k>1 when it is desirable to separate out defect clusters that comprise a large number of defects) of the defects, with the defect coordinates given by the results file 103 or processed results file passed from the classification process 004. Rule parameters 006*d* provide a default definition or a user-specified definition for each of the types of scratch (i.e. random linear scratch, random curved scratch, random poly-line scratch) by specifying for example the minimum number of defects in the types of scratch clusters, the degree of elongation of the defect cluster, the degree of linearity of a linear scratch, a degree of proximity of the defects to neighboring defects, the width or size of the scratch envelope, a region of the die harboring the defects, etc. Using the computed k-NN defect distances, identify the defect clusters in the processed results file; draw an envelope around the defect clusters to identify the scratch clusters, according to the rules specified in 006*d*; analyze scratch clusters to determine if there are any scratch clusters that lie on the same line or arc (co-linear) within the tolerance of the rules parameter defined in 006*d*; group co-linear clusters into super clusters. 006 then extracts spatial parameters from the cluster and super-cluster envelopes (for example, length, width, area, perimeter, centroid, radius of curvature, angle of major axis, distance to nearest scratch centroid, etc.). Defects that have been identified as belonging to a scratch cluster or a scratch super-cluster are stored in the scratch results file 006*f* so that they can be classified and processed by 004, as defined by rules parameter 004*a*. To recognize 006*g* patterned scratches, compare the spatial attributes of the scratch clusters and scratch super-clusters against parameters in the pattern bank 011*n*, and if a match occurs, identify the source of the scratch as given by the matched pattern in the pattern bank 011*n*.

As one example, FIG. 6*a* illustrates a defect wafer map exhibiting an annular defect signature, as well as a scratch; FIG. 6*b* shows the scratch cluster isolated and identified, by filtering out defects with a defect k-NN distance greater than 100 μm. FIG. 6*c* shows the scratch envelope drawn around the scratch, from which the spatial parameters of the scratch cluster are extracted (for example, scratch length is 22 μm, angle of major axis is 43°). FIG. 6*d* shows the result of filtering out the defects from identified scratch cluster from the results file of FIG. 6*a*, wherein the remaining defects exhibit an annular defect signature. As another example, FIG. 6*e* illustrates a defect wafer map, with FIG. 6*f* showing the corresponding defect k-NN distance distribution (for k=1) indicating a concentrated non-random grouping of defects from 0 μm to 30 μm, and FIG. 6*g* showing two scratches, isolated and identified by filtering out all defects greater than 30 μm. As a third example, FIG. 6*h* shows another defect wafer map with scratches, and FIG. 6*i* shows the scratches isolated by filtering defects with defect k-NN distance greater than 50 μm.

Figure 3F:
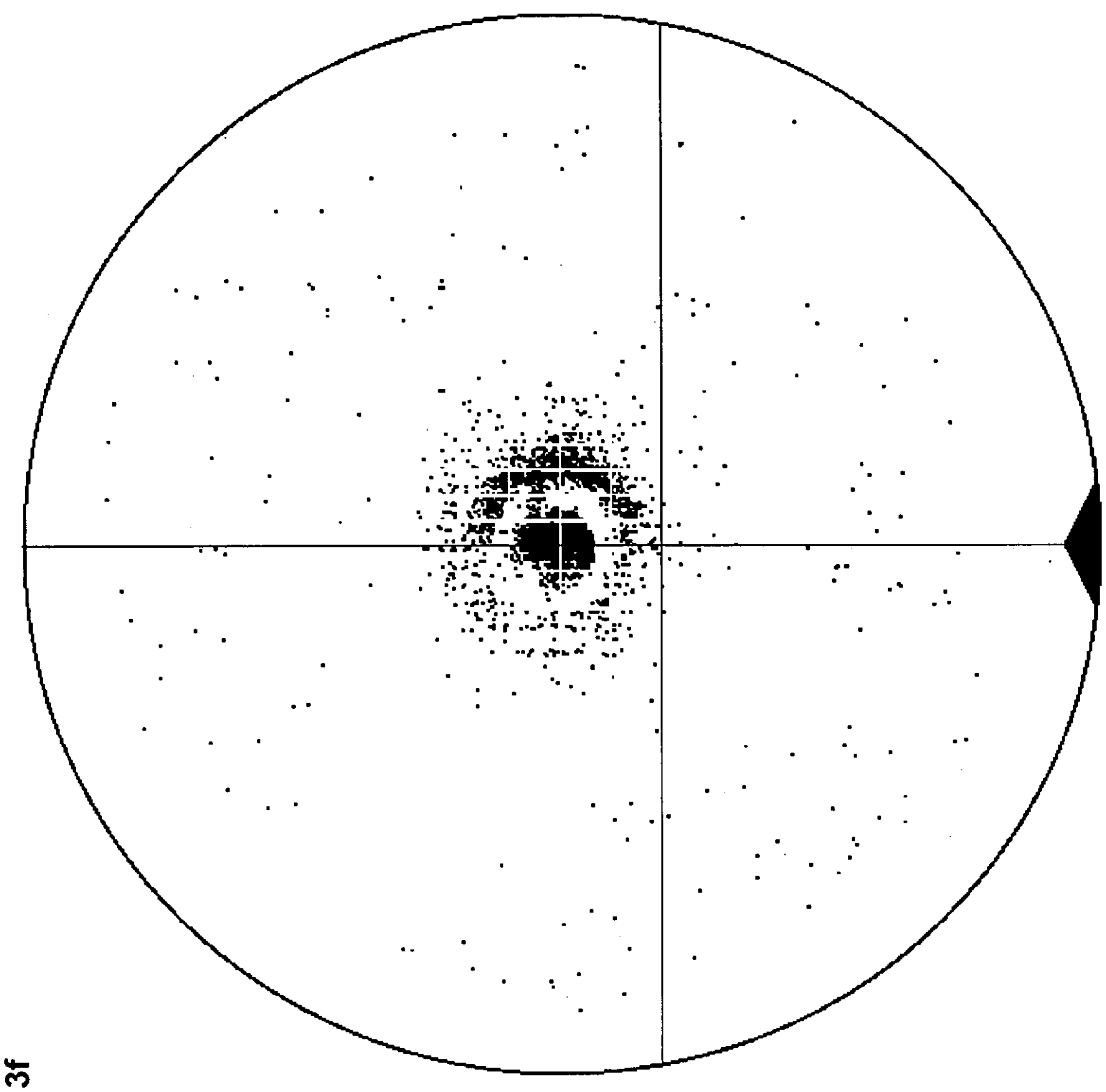
Figure 3G:
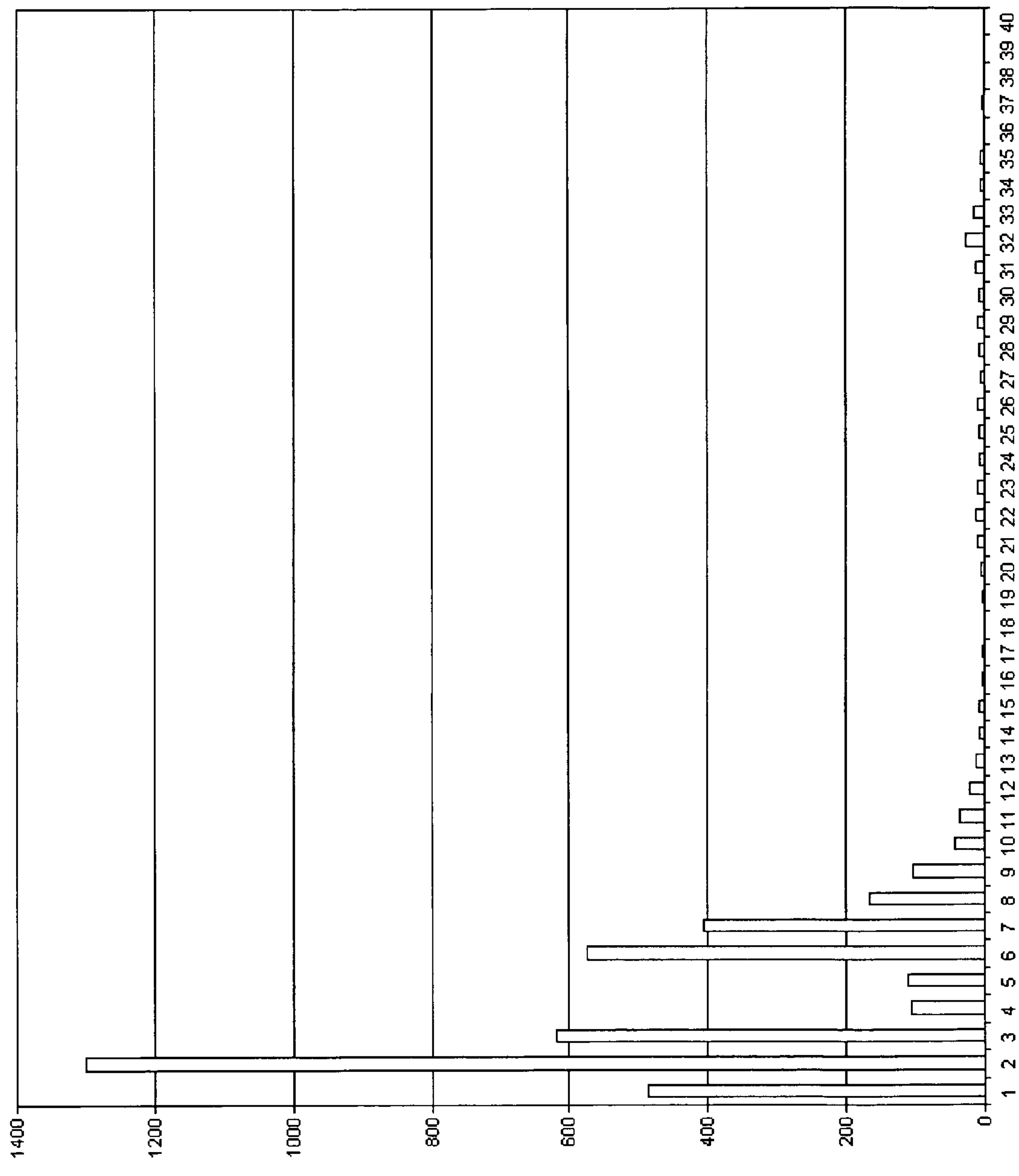

FIG. 7 is a data flow diagram illustrating a method for analyzing distributed defects, according to an embodiment of the present invention. Using defect coordinates as given by results file 103 passed from the classification process 004, characterize the defect signature by using of the following tests:

1) Characterize 007*b* annular defect signature by dividing the wafer into a number of concentric rings. The larger the number of rings, the greater the amount of time to match the signatures. In one embodiment, 20 rings are used. For each ring, the percentage of total number defects in the ring is stored as an annular parameter. FIG. 3*f* shows a wafer defect map of a results file in which the defects are distributed in an annular pattern, according to an embodiment of the present invention. FIG. 3*g* shows a histogram of the number of defects as a function of the rings containing the defects (40 rings are used in this example), wherein the histogram corresponds FIG. 3*f*, according to an embodiment of the present invention.

2) Characterize 007*c* radial defect signature by dividing the wafer into an equal number of pie-slice shaped segments. The larger the number of segments, the greater the amount of time to match the signatures. In one embodiment, 72 segments are used. For each segment, the percentage of total number defects in the segment is stored as a radial parameter.

Figure 3H:
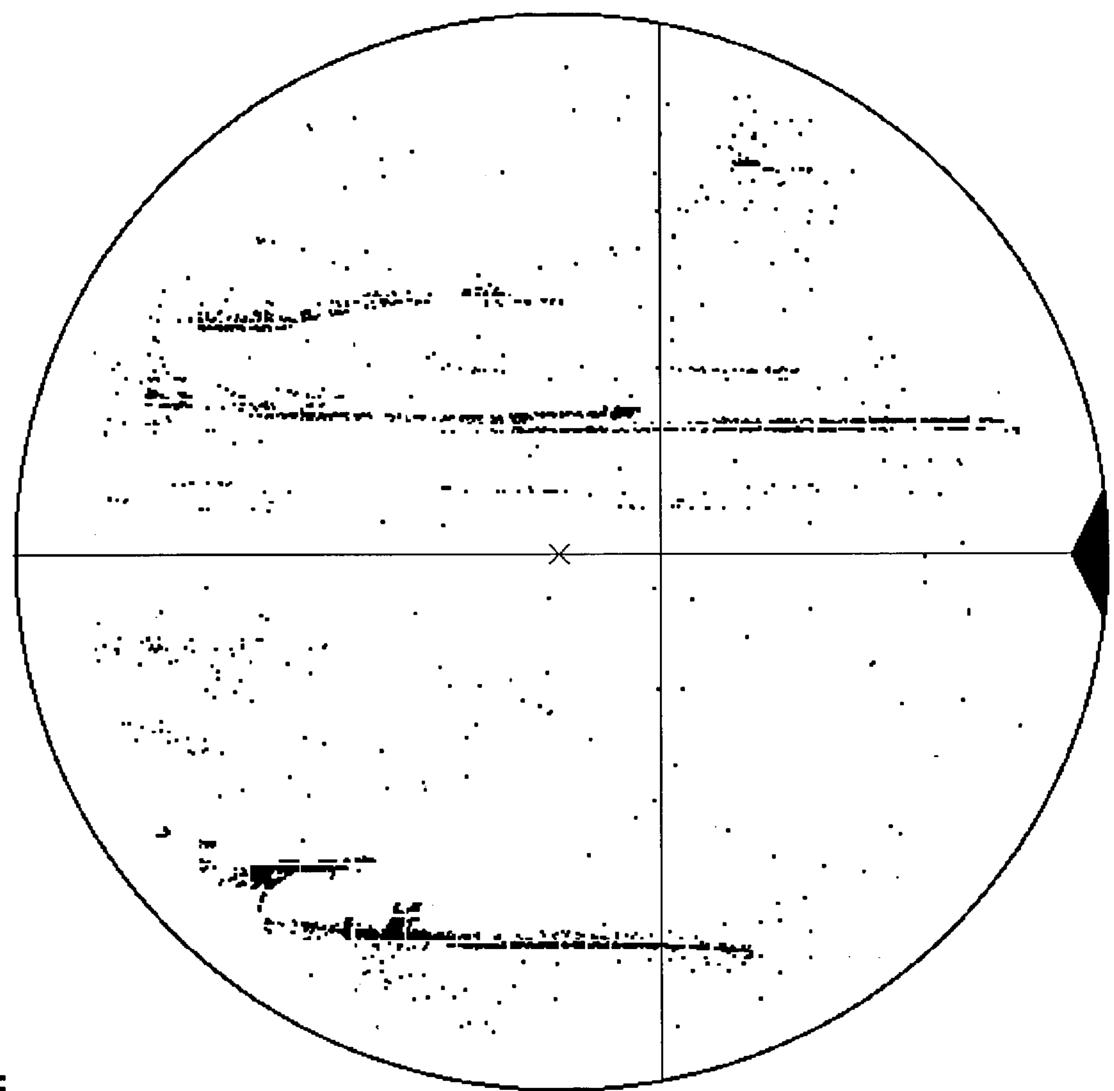
Figure 3I:
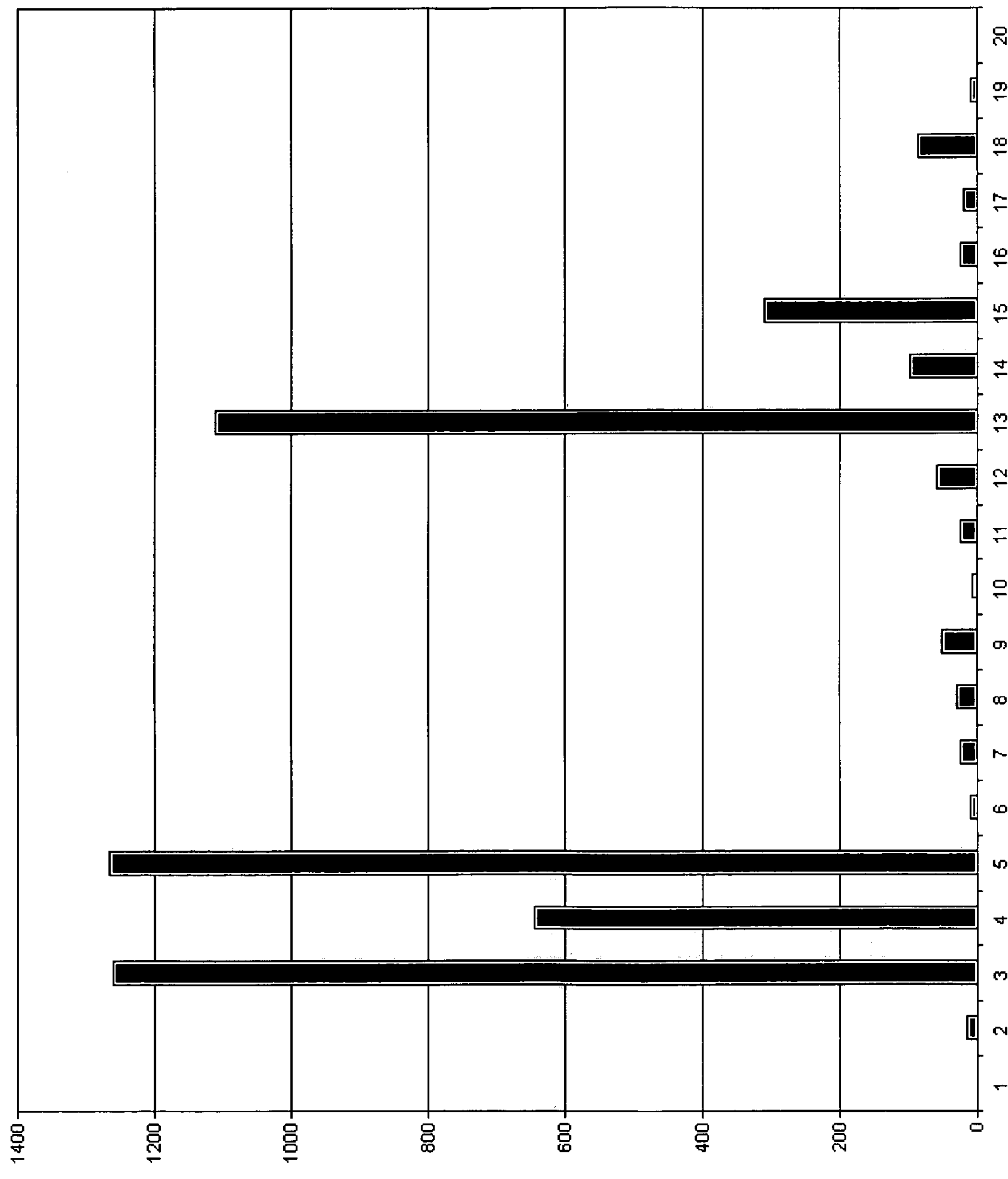
Figure 3J:
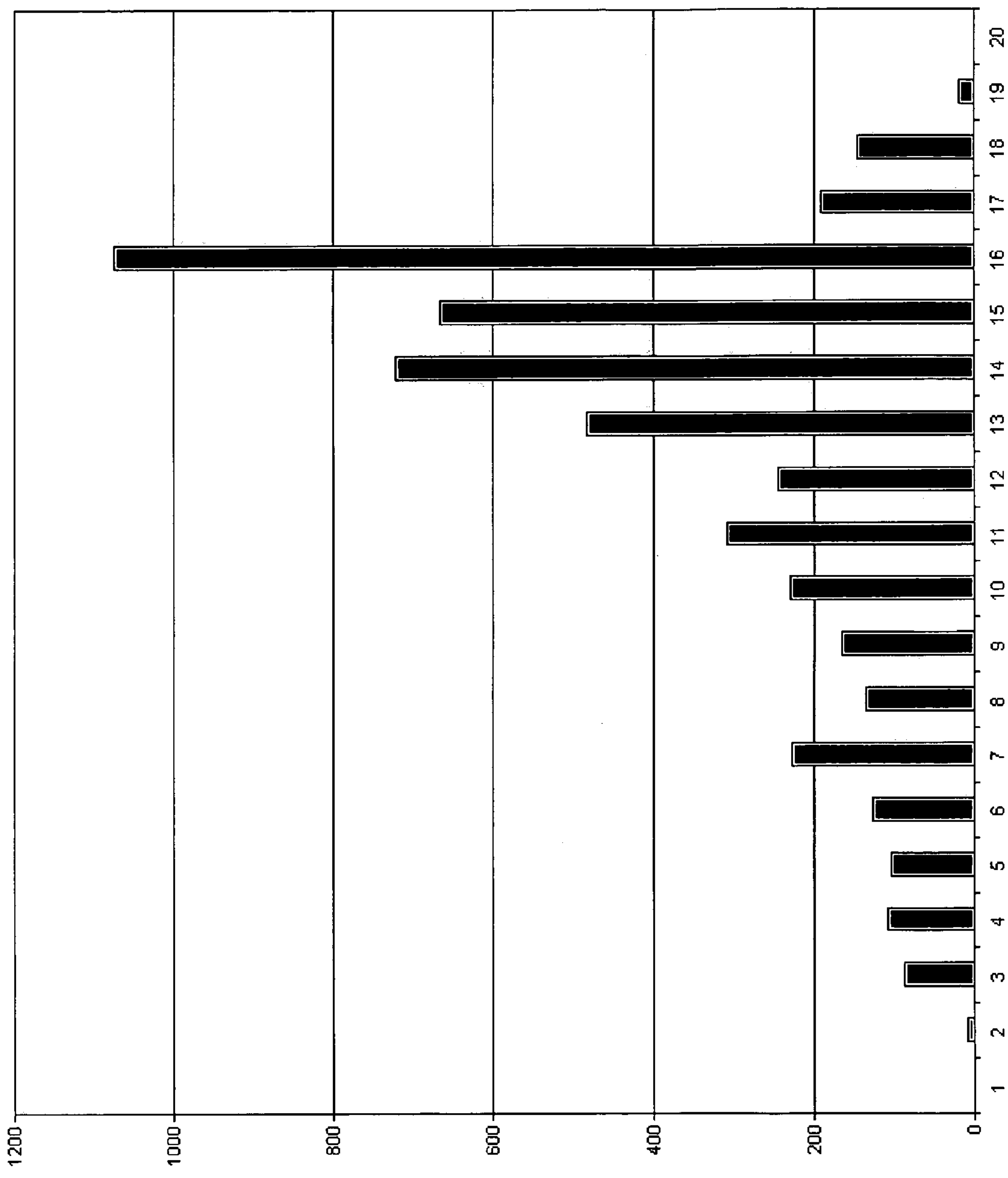

3) Characterize 007*d* zonal defect signature by dividing the wafer, first into a number of horizontal strips, and then into an equal number of vertical strips. The larger the number of strips, the greater the amount of time to match the signatures. In one embodiment, 10 horizontal strips and 10 vertical strips are used. For each horizontal and vertical strip, the percentage of total number defects is stored as a zonal parameter. FIG. 3*h* shows the wafer defect map of a defect signature with a zonal distribution. FIGS. 3*i* and 3*j* show a histogram of the horizontal and vertical distribution of defects across the wafer that correspond to the wafer map in FIG. 3*h*.

Each one of the above three characterization processes receives as input a results file 103 or a processed results file generated from the original results file, and produces as output a set of metrics corresponding to the particular characterized defect signature type. The combined set of annular, radial and zonal metrics are stored 007*f* and undergo pattern recognition 007*h* against the pattern bank using a k-NN matching algorithm, with the resulting pattern flags and patterns (if any) passed to the defect signature classification process 004 when a high probability match occurs. FIG. 7*a* shows a "starfish" pattern matched against an input results file comprising a faint "starfish" defect signature.

FIG. 8 is a data flow diagram illustrating a method for analyzing repeating defects, according to an embodiment of the present invention. If a user-specified recipe calls for identifying repeating die defects, the defects in the results file are stacked and checked for repeating die defects (i.e. multiple defects that have the same X/Y coordinates within user defined limits, as defined in rules parameter 008*d*). When the repeating defect occurrences at a particular location exceed the minimum number as specified in rules parameter 008*d*, the defects are identified as repeating die defects. Die stacks are used to detect repeating die defects and reticle stacks are used to detect repeating reticle defects. Wafer stacks are used to analyze multiple results files. The first step in identifying repeating reticle defects is to read in the reticle layout file to identify the stepper fields on the defect wafer map. The next step is to stack the reticle fields (i.e. overlay the defects from several reticle fields onto a single reticle field). Determine the defect k-NN distance distribution and the defect spatial distribution within the stacked reticle field or within a user-specified area of the reticle field. (Note that limiting the analysis to a specified area of the reticle field may be useful because the distribution of defects may be related to the density of features within the die or reticle.) Test the defect k-NN distribution in the specified area for a normal distribution, and test the spatial distribution for uniformity. If the stacked reticle field shows a non-random distribution (i.e. not normal or not uniform), perform pattern recognition 008*g* using zonal analysis. The zonal analysis extracts a zonal defect signature by dividing the stacked reticle field into a number of horizontal strips and into an equal number of vertical strips. The larger the number of strips, the greater the length of time required to match the reticle signatures. In one embodiment, 10 horizontal strips and 10 vertical strips are used. For each horizontal and vertical strip, the percentage of total number defects is stored as a zonal parameter. Then, match the signature of the stacked reticle field against the pattern bank 011*n* using a k-NN matching algorithm and pass resulting pattern flags and matched pattern signatures (if any) to the defect signature classification process 004. Note that the defects that were identified as repeating defects are classified as such and may later be removed from the results file as the analysis continues, as specified in the user defined recipe.

As an example, FIG. 8*b* shows a wafer defect map with repeating reticle field defects. FIG. 8*c* shows the reticle field layout overlaid onto the defect wafer map. FIG. 8*d* shows the stacked reticle field, revealing a non-random defect signature.

FIG. 9 is a data flow diagram illustrating a method for intelligent process control, according to an embodiment of the present invention. Given one or more recognized defect signature 108, it is desirable to determine 010*a* one or more sources of the defect using pattern bank 011*n* and root cause repository 010*c*. An example of rules parameter 010*d* is the level of confidence in recognizing a defect pattern that is required to take an action, including further analysis to increase confidence. Based on identified defect sources (i.e. identified causal events) and event database 010*e*, generate and/or manage 010*b* events for notification, process control, yield management etc. as set forth above in the description of FIG. 2.

FIG. 10 is a data flow diagram illustrating a method for generating a pattern bank, according to an embodiment of the present invention. The pattern bank is created and "trained" by a skilled user who is familiar with various defect signatures. There are two methods for generating and training a defect signature for the pattern bank. The first is to use an existing results file that is known to contain the defect signature of interest. A typical results file that is known to contain a distributed defect signature also may contain a random distribution of defects and may also contain scratches, micro-scratches or repeating litho defects. Although it is feasible to generate a defect signature for the pattern bank using a results file with the aforementioned defect signatures, these additional defects will obscure the defect signature of interest and/or limit the effectiveness of pattern recognition. Therefore, it is desirable to remove from the results file those defects that are not associated with the defect signature of interest. This may be accomplished in two ways: filtering 011*i* (see previous discussion on filtering) or editing (i.e. using the signature composer to erase unwanted defects). Generate 011*a* pattern metrics by processing the edited and/or filtered results file 103*m* by characterizing 011*b* annular defects, characterizing 011*c* radial defects and characterizing 011*d* zonal defects, as described above. Populate 011*m* the pattern bank 011*n* with the resulting set of pattern metrics 011*f*.

The second method of generating and training a defect signature into the pattern bank is to use a results file editor 011*g* (preferably with a graphical user interface (GUI)) to manually design 011*h* a pattern for processing and characterization 011*b*, 011*c* and 011*d* as described above, with generated 011*a* pattern metrics 011*f* used for populating 011*m* pattern bank 011*n*. Preferably, the present invention also allows for managing 011*k* the pattern classes, for example by using a tree data-structure 011*l* of pattern classes. FIG. 10*a* illustrates a particular pattern in the "bull's eye" pattern class of the pattern bank 011*n*. In order to improve the probability of matching a results file to the correct defect signature in the pattern bank, it may be desirable to add a weighting factor to the pattern metrics 011*f*. The skilled user who is generating the defect signature for the pattern bank may determine that the attributes of the defect signature are most aptly characterized by one of the three characterization types (annular, radial and zonal). In this case, the user may assign a factor that weights one set of pattern metrics higher than the others. This weighting factor is stored with the pattern metrics.

FIG. 10*b* is a data flow diagram illustrating a method for generating a scratch pattern bank 12*e*, according to an embodiment of the present invention. The scratch pattern bank 12*e* is created and "trained" by a skilled user who is familiar with various scratch signatures. There are two methods for generating and training a scratch signature for the scratch pattern bank 12*e*. The first method uses an existing results file known to have the scratch signature of interest. A typical results file known to have a scratch signature may also have a random distribution of defects, micro-scratches and/or repeating litho defects. To generate a scratch signature, the scratch is isolated and the scratch envelope is identified, e.g. by drawing a closed geometric figure that closely approximates the outline of the scratch. Once the scratch envelope is drawn, salient spatial parameters of the scratch envelope (such as length, thickness, centroid, etc; see above discussion of scratches) are extracted. These spatial parameters are then stored in the scratch pattern bank 12*e*. The second method of generating and training a defect signature into the scratch pattern bank 12*e* comprises using a Scratch Signature Composer 012*a* (preferably with a graphical user interface (GUI)) to manually design 012*b* a scratch pattern, wherein such generated 012*c* scratch pattern metrics are used for populating 012*d* scratch pattern bank 012*e*. Preferably, the present invention also allows for managing the scratch patterns, for example by using a tree data-structure of patterns.

An advantageous aspect of the present invention is the recognition of a defect signature that has been translated, mirrored or rotated with respect to a pattern stored in the pattern bank 011*n*. Instead of training a multitude of signatures that illustrate the translation, rotation or mirroring of a given pattern, the metadata (i.e. pattern metrics) used by the present invention to store trained patterns allows a user to specify 011*o* the desired translation, rotation and/or mirroring at the time of training the defect signature into the pattern bank. The pattern can then be automatically translated and rotated in increments that correspond to the number of zonal strips and pie-slice shaped segments, respectively.

If a user specifies that a trained pattern is categorized as zonal (i.e. the characteristics of the defect signature are primarily determined by its horizontal and vertical spatial attributes), the user may further specify that the signature may be translated in the horizontal direction, in the vertical direction or at a 45° diagonal. The user may also specify that the signature may be mirrored about a horizontal line through the wafer center or a vertical line through the wafer center. Translation in the horizontal direction involves shifting the defect parameter values (metadata) from each vertical strip one strip to the right or left. This accomplishes a horizontal translation of one strip width. Shifting a number of strips equal to the total number of vertical strips will effectively translate the pattern through the full range of horizontal positions. Likewise, shifting the values from the horizontal strips will effectively translate the pattern through the full range of vertical positions. Shifting both the horizontal strips and the vertical strips translates the defect signature at a 45° diagonal. In a similar fashion, horizontal mirroring of a zonal signature may be accomplished by reversing the order of the vertical strips; vertical mirroring may be accomplished by reversing the order of the horizontal strips.

If a user specifies that a trained pattern is categorized as radial (i.e. the characteristics of the defect signature are primarily along the radii of the wafer), the user may further specify that the signature may be rotated from its original position. Rotation involves shifting the defect parameter values (metadata) from each pie-slice shaped segment to the segment to the right or left. This accomplishes an incremental angular rotation of one segment. Shifting a number of segments equal to the total number of segments will effectively rotate the pattern through a full circle.

FIG. 11 is a diagram illustrating the GUI components of the automated defect sourcing system, according to an embodiment of the present invention. Defect analysis and pattern management GUI 500 provides an interface to pattern bank 011*n* and scratch signature bank 012*e*, and is preferably used by a defect engineer. Root cause and parametric rule management GUI 501 provides an interface to parametric rules and root cause repository 010*c*, and is preferably used by a manufacturing engineer. Event management GUI 502 provides an interface to event repository 010*e*, and is preferably used by a manufacturing engineer. Automated defect sourcing work flow assembly GUI 503 provides an interface to pattern bank 011*n*, parametric rules, root cause repository 010*c*, event repository 011*e* and automated defect sourcing work flow job 504, and is preferably used by a process engineer. FIG. 11*a* shows an example defect analysis and pattern management GUI 500, according to an embodiment of the present invention. FIG. 11*b* shows an example GUI for an automated defect sourcing work flow assembly 503, according to an embodiment of the present invention.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. The described embodiments are not limited to semiconductor manufacturing, but also apply to micro-manufacturing and nano-manufacturing of substrates other than semiconductor wafers. Other variations and embodiments are possible in light of above teachings, and it is thus intended that the scope of invention not be limited by this Detailed Description, but rather by Claims following.

We claim:

1. A method for processing a semiconductor manufacturing results file (results file), comprising the steps of:

determining a set of concentric wafer-rings of a wafer-map, the wafer-map given by the results file, the results file indicating a set of defect-coordinates associated with a set of wafer-defects falling within the wafer-map; and computing a set of defect-percentages, wherein a first defect-percentage of the set of defect-percentages is (a) associated with a first wafer-ring of the set of concentric wafer-rings and (b) represents a ratio of the number of wafer-defects falling within the first wafer-ring to the total number of wafer-defects falling within the wafer-map.

2. The method of claim 1, further comprising the step of storing the set of defect-percentages in a defect-signature bank.

3. The method of claim 2, further comprising the step of associating a weighting-factor with the set of defect-percentages and storing the weighting-factor in the defect-signature bank.

4. A method for processing a semiconductor manufacturing results file (results file), comprising the steps of:

determining a first set of pie-slice shaped segments (wafer-slices) of a wafer-map, the wafer-map given by the results file, the results file indicating a set of defect-coordinates associated with a set of wafer-defects falling within the wafer-map; and computing a first set of defect-percentages, wherein a first defect-percentage of the set of defect-percentages is (a)

associated with a first wafer-slice of the first set of wafer-slices and (b) represents a ratio of the number of wafer-defects falling within the first wafer-slice to the total number of wafer-defects falling within the wafer-map.

5. The method of claim 4, further comprising the step of storing the first set of defect-percentages in a defect-signature bank.

6. The method of claim 5, further comprising the step of associating a weighting-factor with the first set of defect-percentages and storing the weighting-factor in the defect-signature bank.

7. The method of claim 4, further comprising wrapping the first set of defect-percentages to obtain a second set of defect-percentages corresponding to a second set of wafer-slices, the second set of wafer-slices corresponding to a rotated version of the first set of wafer-slices.

8. A method for processing a semiconductor manufacturing results file (results file), comprising the steps of:

determining a first set of horizontal wafer-strips (horizontal-strips) of a wafer-map, the wafer-map given by the results file, the results file indicating a set of defect-coordinates associated with a set of wafer-defects falling within the wafer-map; and computing a first set of horizontal-defect-percentages, wherein a first horizontal-defect-percentage of the first set of horizontal-defect-percentages is (a) associated with a first horizontal-strip of the first set of horizontal-strips and (b) represents a ratio of the number of wafer-defects falling within the first horizontal-strip to the total number of wafer-defects falling within the wafer-map.

9. The method of claim 8, further comprising wrapping the first set horizontal-defect-percentages to obtain a second set of horizontal-defect-percentages corresponding to a second set of horizontal wafer-strips, the second set of horizontal wafer-strips corresponding to a wrapped version of the first set of horizontal wafer-strips.

10. The method of claim 8, further comprising the steps of:

determining a first set of vertical wafer-strips (vertical-strips) of the wafer-map; and computing a first set of vertical-defect-percentages, wherein a first vertical-defect-percentage of the first set of vertical-defect-percentages is (a) associated with a first vertical-strip of the first set of vertical-strips and (b) represents a ratio of the number of wafer-defects falling within the first vertical-strip to the total number of wafer-defects falling within the wafer-map.

11. The method of claim 10, further comprising wrapping the first set vertical-defect-percentages to obtain a second set of vertical-defect-percentages corresponding to a second set of vertical wafer-strips, the second set of vertical wafer-strips corresponding to a wrapped version of the first set of vertical wafer-strips.

12. The method of claim 10, further comprising the step of storing the first set of horizontal-defect-percentages and the first set of vertical-defect-percentages in a defect-signature bank.

13. The method of claim 12, further comprising the step of associating a weighting-factor with the first set of horizontal-defect-percentages and the first set of vertical-defect-percentages and storing the weighting-factor in the defect-signature bank.

14. A method for processing a semiconductor manufacturing results file (results file), comprising the steps of:

determining a plurality of dies within a wafer-map, the wafer-map indicated by the results file, the results file indicating a first set of defect-coordinates associated with a set of wafer-defects falling within the wafer-map;

stacking the plurality of dies resulting in a die-overlay; and analyzing the die-overlay to detect one or more repeating patterns.

15. The method of claim 14, wherein the analyzing step comprises a k-nearest-neighbor (k-NN) algorithm to determine the one or more repeating patterns, and wherein the k-NN algorithm uses a second set of defect-coordinates, the second set of defect-coordinates corresponding to the first set of defect coordinates but modified to use the die-overlay as reference.

16. A method for processing a semiconductor manufacturing results file (results file), comprising the steps of:

determining a plurality of reticle-fields within a wafer-map, the wafer-map indicated by the results file, the results file indicating a set of defect-coordinates associated with a set of wafer-defects falling within the wafer-map;

stacking the plurality of reticle-fields resulting in a reticle-field-overlay; and analyzing the reticle-field-overlay to detect a repeating pattern.

17. The method of claim 16, wherein the analyzing step comprises a k-nearest-neighbor (k-NN) algorithm to determine the one or more repeating patterns, and wherein the k-NN algorithm uses a second set of defect-coordinates, the second set of defect-coordinates corresponding to the first set of defect coordinates but modified to use the reticle-field-overlay as reference.

18. A method for processing a semiconductor manufacturing results file (results file), comprising the steps of:

computing a set of k-nearest-neighbor distances (k-NN distances) for a set of defect-coordinates, the set of defect-coordinates indicated by the (results file), the set of k-NN distances indicating a first defect-cluster; and extracting a set of defect-cluster-parameters for the first defect-cluster, the set of defect-cluster-parameters comprising defect-cluster length, defect-cluster width, defect-cluster area, defect-cluster perimeter, defect-cluster centroid, radius of defect-cluster curvature, angle of defect-cluster major axis, or distance of defect-cluster to nearest scratch centroid.

19. The method of claim 18, wherein the extracting step comprises determining an envelope around the defect-cluster.

20. The method of claim 18, further comprising the step of matching the set of defect-cluster-parameters against a defect-signature bank.

* * * * *